US012317057B2

(12) United States Patent
Sheaffer et al.

(10) Patent No.: US 12,317,057 B2
(45) Date of Patent: May 27, 2025

(54) SELF-CALIBRATING MICROPHONE AND LOUDSPEAKER ARRAYS FOR WEARABLE AUDIO DEVICES

(71) Applicant: Apple Inc., Cupertino, CA (US)

(72) Inventors: Jonathan D. Sheaffer, San Jose, CA (US); Daniel K. Boothe, San Francisco, CA (US); Martin E. Johnson, Los Gatos, CA (US); Neal D. Evans, Sunnyvale, CA (US); Nikolas T. Vitt, Redwood City, CA (US); Christopher T. Eubank, Mountain View, CA (US); Peter V. Jupin, Copenhagen (DK); Symeon Delikaris Manias, Los Angeles, CA (US); Shai Messingher Lang, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/497,933

(22) Filed: Oct. 30, 2023

(65) Prior Publication Data

US 2024/0073638 A1 Feb. 29, 2024

Related U.S. Application Data

(60) Division of application No. 17/514,881, filed on Oct. 29, 2021, now Pat. No. 11,832,082, which is a (Continued)

(51) Int. Cl.
*H04S 7/00* (2006.01)
*H04R 1/10* (2006.01)
(Continued)

(52) U.S. Cl.
CPC ........... *H04S 7/301* (2013.01); *H04R 1/1008* (2013.01); *H04R 1/403* (2013.01); *H04R 1/406* (2013.01);
(Continued)

(58) Field of Classification Search
None
See application file for complete search history.

(56) References Cited

U.S. PATENT DOCUMENTS 7,720,232 B2 5/2010 Oxford
9,955,279 B2 4/2018 Riggs et al.
(Continued)

FOREIGN PATENT DOCUMENTS

EP 3280154 2/2018

OTHER PUBLICATIONS

International Search Report and Written Opinion for International Application No. PCT/US2020/038485 mailed Nov. 9, 2020, 16 pages.
(Continued)

*Primary Examiner* — Kenny H Truong
(74) *Attorney, Agent, or Firm* — Aikin & Gallant, LLP

(57) ABSTRACT

A method for self-calibrating a sound pickup process that uses a microphone array in a wearable device that also includes a loudspeaker, where the microphone array being in a physical arrangement with respect to the loudspeaker. The method obtains, for each of several microphones of the microphone array, one or more transfer functions that each represent a response of the microphone to sound from a position in an acoustic space. The method determines whether a physical arrangement of the microphone array with respect to the loudspeaker has changed and adjusts the transfer function, for at least one of the microphones of the several microphones, in response to determining that the current physical arrangement of the microphone array with respect to the loudspeaker has changed.

20 Claims, 12 Drawing Sheets

Related U.S. Application Data continuation of application No. PCT/US2020/038485, filed on Jun. 18, 2020.

(60) Provisional application No. 62/865,089, filed on Jun. 21, 2019.

(51) Int. Cl.
*H04R 1/40* (2006.01)
*H04R 29/00* (2006.01)

(52) U.S. Cl.
CPC ........ *H04R 29/005* (2013.01); *H04S 2400/01* (2013.01); *H04S 2420/01* (2013.01)

(56) References Cited

U.S. PATENT DOCUMENTS

| | | | | |
|---|---|---|---|---|
| 10,777,214 | B1 | 9/2020 | Shi et al. | |
| 2013/0329908 | A1* | 12/2013 | Lindahl | G10L 21/0208 381/92 |
| 2015/0230036 | A1* | 8/2015 | Pedersen | H04R 1/406 381/330 |
| 2017/0034623 | A1 | 2/2017 | Christoph et al. | |
| 2018/0041837 | A1 | 2/2018 | Woelfl | |
| 2019/0098431 | A1 | 3/2019 | Riggs et al. | |

OTHER PUBLICATIONS

International Preliminary Report on Patentability for International Application No. PCT/US2020/038485 mailed Dec. 30, 2021.

* cited by examiner

Far-field transfer function measurement

Near-field transfer function measurement

Measurement of a near-field transfer function of loudspeaker 105a

Measurement of a near-field transfer function of loudspeaker 105b

SELF-CALIBRATING MICROPHONE AND LOUDSPEAKER ARRAYS FOR WEARABLE AUDIO DEVICES

This application is a Divisional of co-pending U.S. patent application Ser. No. 17/514,881, filed Oct. 29, 2023, which is a continuation of International Application No. PCT/US2020/038485 filed Jun. 18, 2020, which claims priority to U.S. Provisional Patent Application No. 62/865,089 filed Jun. 21, 2019.

FIELD

An aspect of the disclosure relates to a wearable audio device having a spatial audio rendering processor that calibrates audio beamforming array processing algorithms in response to a change in a physical shape of the wearable audio device. Other aspects are also described.

BACKGROUND

Beamforming is an audio signal processing operation in which transducer arrays are used for directional sound transmission or reception. For example, in the case of directional sound reception, a microphone array, normally having two or more microphones, capture sound that is processed to extract spatial audio information. For example, in the case in which several sound sources are picked up by the microphone array, beamforming allows for the extraction of an audio signal that is representative of one of the several sound sources. Thereby allowing the microphone array to focus sound pickup onto that sound source, while attenuating (or filtering out) the other sound sources.

With regards to directional sound transmission, a loudspeaker array, normally having two or more loudspeakers, generates beam patterns to project sound in different directions. For example, a beamformer may receive input audio channels of sound program content (e.g., music) and convert the input audio channels to several driver signals to drive the loudspeakers of the loudspeaker array to produce a sound beam pattern.

SUMMARY

An aspect of the disclosure is to perform transfer function measurements for each different physical arrangement of a wearable device's beamforming array, such as a microphone array or a loudspeaker array, to account for several shapes of the wearable device. These measurements, may be performed in a dedicated anechoic chamber in which the wearable device is placed and morphed (manipulated) into a given shape. To perform the measurements for a microphone array, loudspeakers are positioned about the wearable device, each representing a sound source in an acoustic space. Each loudspeaker independently produces a sound, in order to measure the transfer functions for each of the microphones in the array for that location of the sound source. Conversely, to perform the measurements for a loudspeaker array, microphones are positioned about the wearable device, each representing a sound destination in space. Each loudspeaker of the loudspeaker array separately produces a sound, in order to measure a transfer function from each loudspeaker to each microphone that is about the device.

Once the measurements for a given physical arrangement are complete, the physical arrangement of the beamforming array may be measured and associated with the transfer functions. These measurement processes may be performed for several different shapes of the wearable device; each shape being associated with a different set of transfer functions.

An aspect of the disclosure relates to determining the physical arrangement of the beamforming array through the use of at least one of several methods. An acoustic method relates to measuring a near-field transfer function of at least one of the audio elements of the beamforming array, which represents an acoustic transmission path between an audio element and a known location. To perform the measurement for a microphone array, a loudspeaker of the device outputs an audio signal (e.g., a stimulus sound). Each microphone picks up the sound and computes a near-field transfer function, each representing a different transmission path between the microphone and the loudspeaker. Conversely, to perform the measurements for a loudspeaker array, each loudspeaker outputs an audio signal that is then picked up by a microphone of the device and computes a near-field transfer function for each loudspeaker. The combination of near-field transfer functions of elements of an array represents a particular physical arrangement of a beamforming array, since different arrangements of elements will create different transmission paths. Other methods include an optical method in which each physical arrangement of the array is associated with image data captured by a camera, and a mechanical sensing method in which a given physical arrangement is associated with mechanical sensing data.

An aspect of the disclosure is a wearable device with a microphone array that is capable of calibrating a sound pickup process that uses the (e.g., far-field) transfer functions in order to account for different arrangements of the microphone array. The wearable device obtains one or more of the far-field transfer functions for each of the microphones that may have been previously measured in the dedicated anechoic chamber. The obtained far-field transfer functions may be for a given physical arrangement of the microphone array. The wearable device may use the far-field transfer functions to perform a beamforming sound pickup process in which sound from a particular sound source at a location external to the wearable device is being captured with a directional beam pattern. The direction and/or directivity of the directional beam pattern is dependent upon the accuracy of the far-field transfer functions with respect to the physical arrangement of the microphone array. When, however, the physical arrangement of the microphone array changes (e.g., due to a different user wearing the device), the directional beam pattern may be negatively affected, since the far-field transfer functions may no longer be an accurate representation of the phase differences between the microphones in the array. Therefore, the wearable device determines whether a physical arrangement of the array has changed. For example, as described herein, the wearable device may compare (e.g., near-field) transfer functions determined using the acoustic method with pre-existing near-field transfer functions that represent a previous physical arrangement of the array. If the newly determined near-field transfer functions are different from the pre-existing near-field transfer functions, the device determines that the physical arrangement of the array has changed. In response, the wearable device adjusts the far-field transfer functions according to the changes in the physical arrangement. For example, the wearable device may retrieve the pre-measured far-field transfer functions, as previously described, that are associated with the current physical arrangement of the microphone array.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The aspects of the disclosure are illustrated by way of example and not by way of limitation in the figures of the accompanying drawings in which like references indicate similar elements. It should be noted that references to "an" or "one" aspect of the disclosure in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Several aspects of the disclosure with reference to the appended drawings are now explained. Whenever the shapes, relative positions and other aspects of the parts described in the aspects are not explicitly defined, the scope of the disclosure is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

In one aspect, as described herein, a "beamforming array" is an array of audio elements that is capable of producing at least one directional beam pattern. Specifically, a beamforming array may include either a microphone array having two or more microphones, a loudspeaker array having two or more loudspeakers, or a combination of both.

In another aspect, as described herein, a "transfer function" represents a travel path (or response) between an audio element, such as a microphone, and a sound source, such as a loudspeaker, in an acoustic space. In one aspect, a transfer function, a response, and an impulse response as used herein are equivalents to one another. In some aspects, the impulse response is the response of an audio element in the time domain. In other aspects, the transfer function is the frequency response of the impulse response, and is in the frequency domain.

Figure 1:
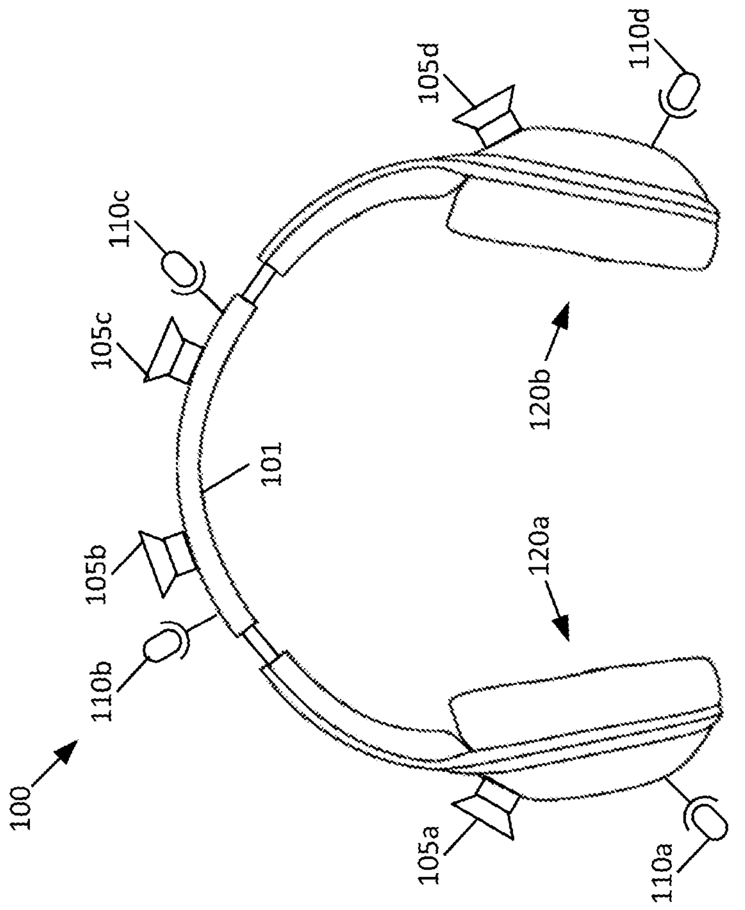
FIG. 1 shows a wearable device in which an audio system for self-calibrating a beamforming array is operating.

FIG. 1 shows a wearable audio device 100 (hereafter referred to as "wearable device 100") that is illustrated as a pair of over-the-ear headphones, in which an audio system for self-calibrating a beamforming array is operating. The headphones include a right housing 120*a* and a left housing 120*b* that are both coupled to a headband 101. In one aspect, the housings and headband may make up a body (or structure) of the headphones. In another aspect, the physical shape of the wearable device may be adjusted in one or more ways. For instance, both housings may be slidably coupled to the headband in order to allow the housings to move away from (or towards) the headband to allow a user to adjust the fit (e.g., the placement of the housings) on the user's head. In addition, the wearable device may be arranged to bend and change shape. For instance, the headband and/or the housings may include flexible materials (e.g., plastic, metal, etc.), that allows them to flex inward and outward. Coupled to (or integrated into) the headband and/or housings are several microphones 110*a*-110*d* and several loudspeakers 105*a*-105*d*. The microphones 110 may be any type of microphone (e.g., a differential pressure gradient micro-electro-mechanical system (MEMS) microphone) that will be used to convert acoustical energy caused by sound wave propagating in an acoustic space into an electrical microphone signal. In one aspect, the microphones 110 are "external" microphones. For example, while the wearable device 100 is worn by a user, the microphones 110 are not positioned inside the user's ear, but rather positioned outside the ear of the user, so as to sense sound waves propagating within an acoustic (or ambient) environment and towards (and/or away from) the user. Each of the loudspeakers 105 may be an electrodynamic driver that may be specifically designed for sound output at certain frequency bands, such as a subwoofer, tweeter, or midrange driver, for example. In one aspect, any loudspeaker 105 may be a "full-range" (or "full-band") electrodynamic driver that reproduces as much of an audible frequency range as possible. In one aspect, the loudspeakers 105*a*-105*d* are "extra-aural" loudspeakers that are configured to produce sound into the acoustic environment, rather than being loudspeakers that are inserted into or placed on top of an ear of a user. In another aspect, at least one of the loudspeakers may be an "in-ear" or "on-ear" loudspeaker that is arranged to project sound into the user's ear. In this case, each of the housings 120*a* and 120*b* may include at least one loudspeaker that is arranged to project sound into a respective ear of the user.

The microphones 110*a*-110*d* make up an array of microphones and loudspeakers 105*a*-105*d* make up an array of loudspeakers. Audio elements of both arrays are positioned as follows: microphone 110*a* and loudspeaker 105*a* are positioned on the right housing 120*a*; microphone 110*b*, loudspeaker 105*b*, microphone 110*c*, and loudspeaker 105*c* are positioned on the headband 101, and microphone 110*d* and loudspeaker 105*d* are positioned on the left housing 102*b*. The positions of the microphones 110 make up a physical arrangement of the microphone array, with respect to each other and/or other parts of the wearable device 100, such as loudspeaker 105*a*. Similar to the microphone array, the loudspeakers 105 make up a physical arrangement of the loudspeaker array, with respect to each other and/or other parts of the wearable device 100, such as microphone 110*a*. In one aspect, rather than including four microphones and four loudspeakers, the number of microphones and/or loudspeakers integrated into the wearable device 100 may be more or less and be arranged in any fashion. In one aspect, the device 100 may include only a microphone array, only a loudspeaker array, or both arrays as illustrated in this figure.

Although the wearable device 100 is a pair of over-the-ear headphones, the wearable device may be any (smart) electronic device that is capable of being worn by a user and/or being able to change its physical shape. For example, the wearable device may be any hearable device, which is an electronic in-ear, on-ear, or over-ear electronic audio device that is designed to output binaural audio. Examples hearable devices may include earphones, headphones, or ear implants, such as hearing aids. In one aspect, the wearable device may be a head-mounted display (HMD), such as smart glasses. In another aspect, the wearable device may be an accessory, such as a headband, a necklace, a bracelet, a watch, etc. Rather than being a separate accessory, the wearable device may be incorporated into an object, such as clothing worn by a user (e.g., a jacket, a shoe, a hat, etc.). In one aspect, the wearable device may be a combination of several separate electronic devices that act in concert (e.g., having wireless/wired communication with one another), rather than a single electronic device. In this case, the elements of either array may be positioned in various locations about an object. For instance, when the object is a jacket, microphones 110*a* and 110*b* may each be positioned on a different sleeve of the jacket and microphones 110*c* and 110*d* may be positioned on a collar of the jacket, while the loudspeakers 105*a*-105*d* may be positioned on the front of the jacket.

The wearable device 100 may be capable of changing its physical shape by having at least a portion (or part) that is adjustable (e.g., capable of being moved with respect to the wearable device 100). For example, with respect to the headphones 100 of FIG. 1, at least one of the housings 120*a* and 120*b* may be slidably coupled to the headband 101, allowing either of the housings to extend away from or retract towards the headband. In addition, the headphones may be arranged to bend. For instance, the headband and/or housings may include (or may be composed of) flexible materials (e.g., plastic, metal, etc.), that allows them to flex inward and outward. Changing the physical shape of the headphones allows a user to adjust the fit (e.g., the placement) of the headphones on the user's head. As a result, the shape of the headphones may be adjusted in order to fit the anthropometrics of a user's head (e.g., a user's head width).

In response to the wearable device 100 changing its physical shape, the physical arrangement of the microphone array and/or the loudspeaker array may also change, since the microphones and loudspeakers are integrated into the wearable device 100. For example, an adjustment (movement) of the right housing 120*a* (e.g., extending away from the headband 101), changes the physical arrangement of the microphone array and the physical arrangement of the loudspeaker array because the adjustment displaces microphone 110*a* and loudspeaker 105*a* with respect to the other microphones 110*b*, 110*c*, and 110*d*; and the loudspeakers 105*b*, 105*c*, and 105*d.*

Rather than or in addition to having moveable parts, the wearable device 100 may have a body that is pliable (e.g., capable of bending, flexing, stretching, contracting, etc.). Examples of such a device may include a bracelet, a watch, and a headband, where each pliable device may stretch or retract in order to fit the anthropometrics of a current user. When elements of the device's beamforming array are integrated into a pliable portion of the wearable device, movement of such a portion with respect to the device will also displace the elements with respect to the beamforming array as a whole. Thus, the physical arrangement of the beamforming array changes in response to the shape of the pliable device being adjusted. As another example, in the case of a smart watch, some audio elements may be integrated in various positions along a watch band that is stretchable to fit a user's wrist, while other audio elements may be integrated in a face of the watch. When worn on a wrist of a person, the watchband will stretch, causing the audio elements integrated therein to stretch apart from one another. Thus, in this example the physical arrangement of the beamforming array change shape with respect to the audio elements integrated in the face of the watch, since these are not affected by the adjusted of the watchband.

In one aspect, wearable devices that include a microphone array may perform beamforming operations (using beamforming algorithms) to spatially select sound sources within an environment in which the wearable device is located. Such spatial selectivity provides for an improved audio signal that includes sound from a particular sound source, while having less noise and reducing interference from other undesirable sound sources. For example, in the case of headphones, the beamforming algorithms may allow a user to focus sound pickup in any direction with respect to the user's position (e.g., in a frontward direction). Similarly, with a loudspeaker array, wearable devices may produce spatially selective sound beam patterns that are directed toward specific locations within the environment.

To achieve accurate spatial selectivity, far-field transfer functions (far-field responses) that represent an acoustic transmission path between a location in space and locations of elements that compose a beamforming array are required in order to produce (e.g., properly steer) an expected directional beam pattern of the array towards the location. In one aspect, the "far-field" represents a distance from the beamforming array in which sound waves radiated from a point source that are no longer seen as spherical, but rather as planar. This may be dependent upon frequency. In one aspect, the distance is at least one meter. In another aspect, the distance of one meter may be considered far-field throughout the entire audible bandwidth. In some aspects, the far-field transfer functions convey an accurate representation of the expected phase differences between each of the elements in the array. For example, with respect to the microphone array that is producing a sound pickup beam pattern towards a sound source, the far-field transfer functions represent phase differences between sound waves captured by each of the microphones. With respect to the loudspeaker array, the far-field transfer functions represent different phase adjustments to be applied to each loudspeaker input signal based on each loudspeaker's location in relation to one another. From far-field transfer functions, beamforming weights may be computed that a beamformer uses to produce accurate directional beam patterns through the beamforming array. Thus, in order to produce accurate beam patterns, far-field transfer functions must be known. More about beamforming weights is described herein.

Wearable devices, such as headphones, smart glasses, and smart watches that include beamforming arrays for performing beamforming algorithms pose a problem with respect to these known transfer functions. Wearable devices are often adjustable to provide a customized fit to a user's anthropometrics. When embedding microphones and/or loudspeakers in adjustable portions of wearable devices, the relative distances between these elements may change from user to user, as the wearable device changes shape. This change of the physical arrangement of the beamforming array may negatively affect the array's performance if far-field transfer functions (and therefore the beamforming weights) used by the wearable device are not meant for the new arrangement of the array.

In order to account for changes in the physical arrangement of a beamforming array of an adjustable wearable device, measurements of the far-field transfer functions may be performed for different shapes of a wearable device. These different shapes of the wearable device may account for changes in different user's anthropometrics. These measurements, however, are processor intensive and time intensive operations. Therefore, rather than a wearable device perform these measurements in real-time in the field, the measurements may be performed beforehand in a controlled environment. Since these measurements are being performed in a controlled environment, far-field transfer functions may be measured for several different physical arrangements of the microphone array, which are caused by the different shapes of the wearable device. Thus, during normal operation of the wearable device in which a beamforming algorithm is using far-field transfer functions for a given physical arrangement of a beamforming array, if a determined physical arrangement of the array changes (e.g., due to one user having different anthropometrics than a previous user), a predefined far-field transfer function may be selected and applied in order to replace a previously inaccurate far-field transfer functions based on that change, thereby alleviating the need for the wearable device to perform the measurements in the field.

Figure 2A:
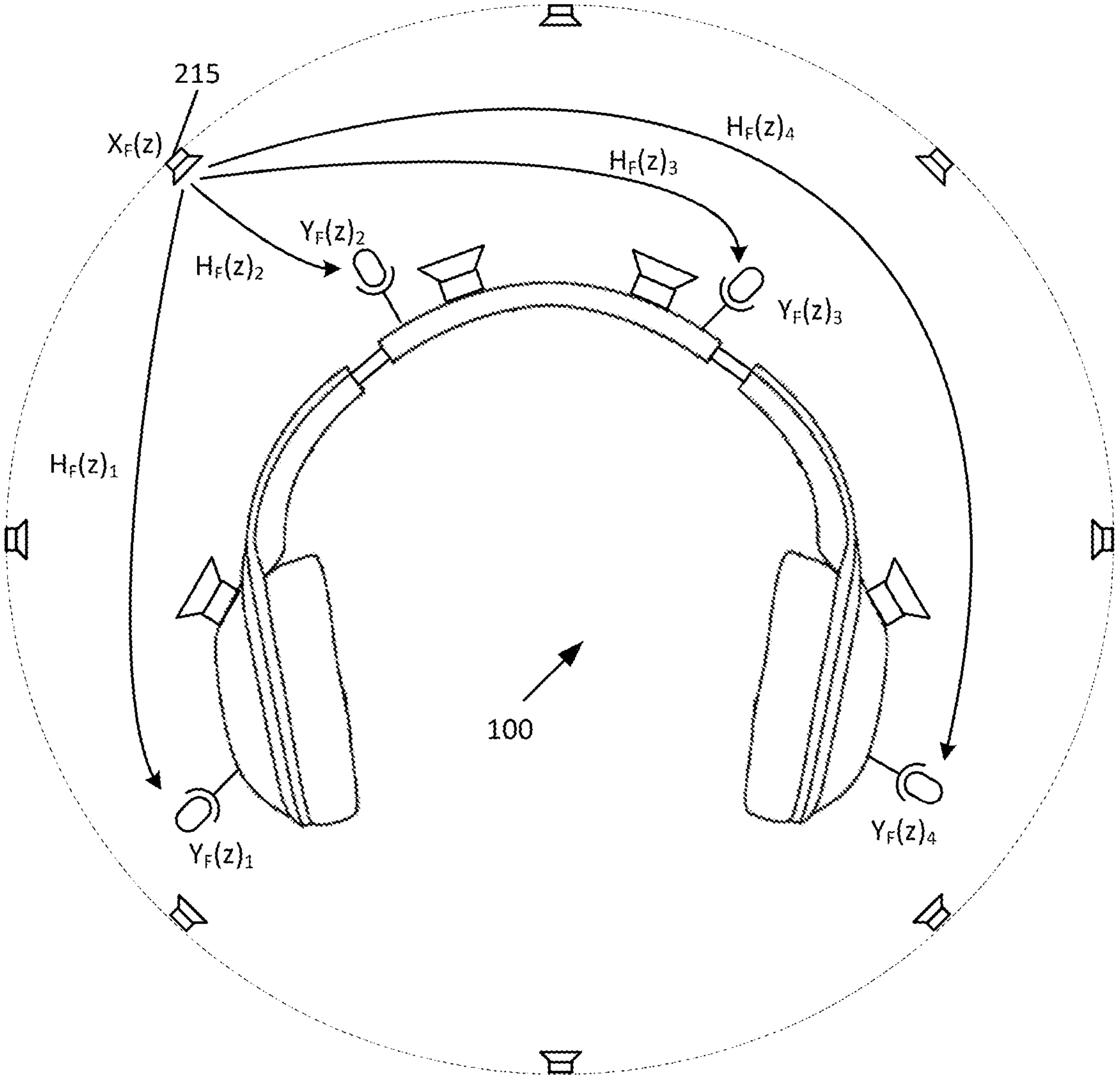
FIG. 2A shows a far-field transfer function measurement for the microphone array of the wearable device shown in FIG. 1.
Figure 2B:
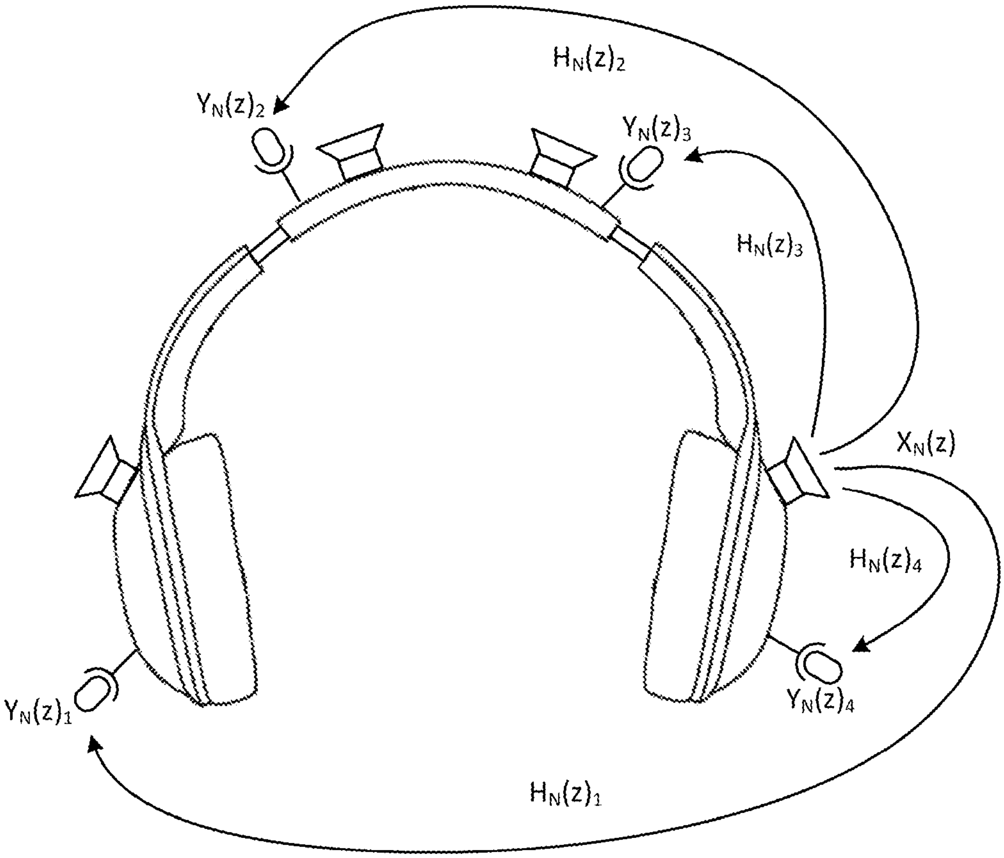
FIG. 2B shows a near-field transfer function measurement for the microphone array of the wearable device shown in FIG. 1

FIGS. 2A-2B show measurements of far-field transfer functions and near-field transfer functions of microphones for a given physical arrangement of a microphone array. In one aspect, at least one of the measurements is performed in a controlled environment (e.g., a laboratory) for a given physical arrangement of a microphone array. In another aspect, the measurements may be performed in the field.

FIG. 2A shows a far-field transfer function measurement for the microphone array of the wearable device 100 as shown in FIG. 1. To perform the far-field transfer function measurement, the wearable device 100 may be placed in an acoustic anechoic chamber that is capable of providing "free field" conditions. In one aspect, the measurement may be performed in any acoustic environment. Loudspeakers are positioned about the wearable device 100, each representing a sound source at a location of a respective loudspeaker. In this case, there is a loudspeaker positioned every 45 degrees about the wearable device. In one aspect, the loudspeakers used during the measurement may be positioned in particular locations that represent a known (or assumed) sound source that the wearable device 100 will encounter during normal operation (e.g., while a user is wearing the device 100). For instance, in the present case, a loudspeaker may be positioned at an approximate location of a mouth of a user of the wearable device 100. Each loudspeaker positioned about the device separately produces an output sound that is then captured by each of the microphones 110*a*-110*d* of the microphone array. The captured sound produced from each separate loudspeaker is then used to measure a far-field transfer function. In one aspect, although the sound is captured by the microphones of the wearable device 100, the measurement (or computation) of the far-field transfer function may be performed on a separate computing device that is in wired/wireless communication with the wearable device.

This figure illustrates the measurement of far-field transfer function (far-field response) in the discrete domain, $H_F(z)$, for each of the microphones with respect to loudspeaker 215. In one aspect, the loudspeaker 215 may act as a directional sound source or an omnidirectional sound source. Generally, the far-field transfer function, which is in the frequency domain, is the difference between an output $X_F(z)$ of a source, in this case it is the loudspeaker 215, and an input of a microphone $Y_F(z)$, mathematically represented as $$H_F(z)=Y_F(z)/X_F(z)$$

Specifically, loudspeaker 215 produces a sound output $X_F(z)$ that may be a stimulus sound, e.g., an impulse or a suitable stimulus such as a sine sweep. Each of the microphones of the array captures sound input $Y_F(z)$ produced by the sound output $X_F(z)$, and converts the sound input $Y_F(z)$ into a microphone signal. From the microphone signal, the far-field transfer function $H_F(z)$ may be computed. In one aspect, the far-field transfer function $H_F(z)$ may be a measured impulse response of the output sound $X_F(z)$ at a location of a corresponding microphone 110. As shown, each of the microphones 110 will have a different transfer function $H_F(z)$, since each microphone 110 has a different acoustic transmission path from the loudspeaker 215. For instance, $H_F(z)$ 4 may represent a higher phase difference than $H_F(z)$, since the acoustic transmission path to microphone 110*d* is longer than the acoustic transmission path to microphone 110*a*. Although illustrated as being measured in the frequency domain, in one aspect, the transfer function may be computed in the time domain.

In one aspect, since the wearable device 100 is worn by a person during operation, in order to achieve a more accurate representation of the far-field transfer function, the measurement may be performed while being positioned on an object that mimics a person's anthropometric body part on which the wearable device 100 is to be worn, such as a manikin. In this case, the headphones may be placed on a head of a manikin, during the measurement process. In one aspect, although illustrated as measuring the transfer functions that each represent a response of the microphones of the microphone array to a sound on an xy-plane, in one aspect, measurements may be performed from sound sources in a three-dimensional (3D) space, accounting for sound sources at different elevations, with respect to the wearable device 100.

Once far-field transfer functions $H_F(z)$ are measured for at least one microphone of the array to a sound source, an arrangement of the microphone array may be determined and associated with the far-field measurements. Since the microphone array is made up of a physical arrangement of microphones that are integrated into the wearable device 100, the physical arrangement of the microphone array may therefore correlate to a given shape of the wearable device. In other words, each physical arrangement of the microphone array may represent a given shape of the wearable device. One way to determine the physical arrangement of the microphone array is an acoustic method in which near-field transfer functions are measured. These transfer functions represent responses of the microphones of the array to (or between) at least one loudspeaker (e.g., 105*d*) that is integrated within the wearable device 100. Thus, near-field transfer functions represent an acoustic transmission path between a loudspeaker and a microphone. Measured near-field transfer functions between the microphones and the loudspeaker may be associated with a given shape of the wearable device, and therefore a given physical arrangement of the microphone array (and vice a versa, as described herein), since transmission paths change as the shape of the device changes. In one aspect, near-field transfer functions are distinguished from far-field transfer functions based on the distance at which the point source is located from the beamforming array. For example, the near-field transfer function represents the acoustic transmission path for a point source that is less than a meter away from the array (or element). More about how the near-field transfer functions correlate to the shape of the wearable device is described herein.

FIG. 2B shows a near-field transfer function measurement for microphones 110 of the microphone array of the wearable device 100 as shown in FIG. 1. In this figure, the near-field transfer function represents a transmission path measured between loudspeaker 105*d* of the wearable device 100 and each microphone in the microphone array. In one aspect, loudspeaker 105*d* may be used since its location remains constant (with respect to various shapes of the wearable device). For example, in the present case, the loudspeaker 105*d* may remain in the same location when only the position of the right housing is adjusted. In this case, the loudspeaker 105*d* is used as a reference point. In another aspect, the measurement may be performed using one of the loudspeakers of the headband 105*b* and/or 105*c*, since their positions do not change when the position of the housings change, thus each loudspeaker may create a reference point. In another aspect, any loudspeaker 105 and/or reference point on the wearable device 100 may be used.

In one aspect, from the measured near-field transfer functions, the position of each of the microphones 110 may be determined with respect to the loudspeaker 105*d*. Since the microphones 110 are integrated into the wearable device 100, as the wearable device 100 changes shape, the microphones 110 will change their position with respect to the loudspeaker 105*d*. As different microphone positions will result in different near-field measurements, e.g., due to shorter or longer transmission paths, phase differences, etc., near-field transfer functions may be associated with a given shape of the wearable device. In this instance, the loudspeaker 105*d* produces an output sound $X_N(z)$ that may be a stimulus sound, such as the stimulus sound that was produced by the loudspeaker 215 during the far-field transfer function measurement. The output sound $X_N(z)$ is sensed by the microphones as input sound $Y_N(z)$, and converted into a microphone signal, from which the near-field transfer function $H_N(z)$ is computed. In one aspect, in order to compute an accurate near-field transfer function, the microphone has to receive a sufficient amount of input sound $Y_N(z)$ from the loudspeaker 105*d*. Therefore, if the wearable device is in an acoustic environment with ambient sound (e.g., background noise), the loudspeaker 105*d* must produce the output sound $X_N(z)$ at a sound level that will ensure that the sound level of input sound $Y_N(z)$ exceeds the ambient sound. In one aspect, the near-field measurement is performed in the acoustic anechoic chamber in which the far-field measurement is performed.

From the near-field transfer function $H_N(z)$, an estimation of the physical arrangement of the microphone array may be made. Similar to the far-field transfer functions, the near-field transfer functions $H_N(z)$ convey an accurate representation of the expected phase differences between sound waves captured by each of the microphones 110 in the microphone array. These phase differences may indicate relative propagation paths of sound waves propagating from the loudspeaker 105*d* and between the microphones 110. Thus, knowing the origin of the sound source (here being the loudspeaker 105*d*) and the relative phase differences and propagation paths between the microphones, the physical arrangement of the microphones may be estimated, relative to the loudspeaker 105*d*. Therefore, the near-field transfer functions $H_N(z)$ represent a physical arrangement of the microphone array. More about estimating the physical arrangement and changes in the physical arrangement of the microphone array using near-field transfer functions is described herein.

Figure 3A:
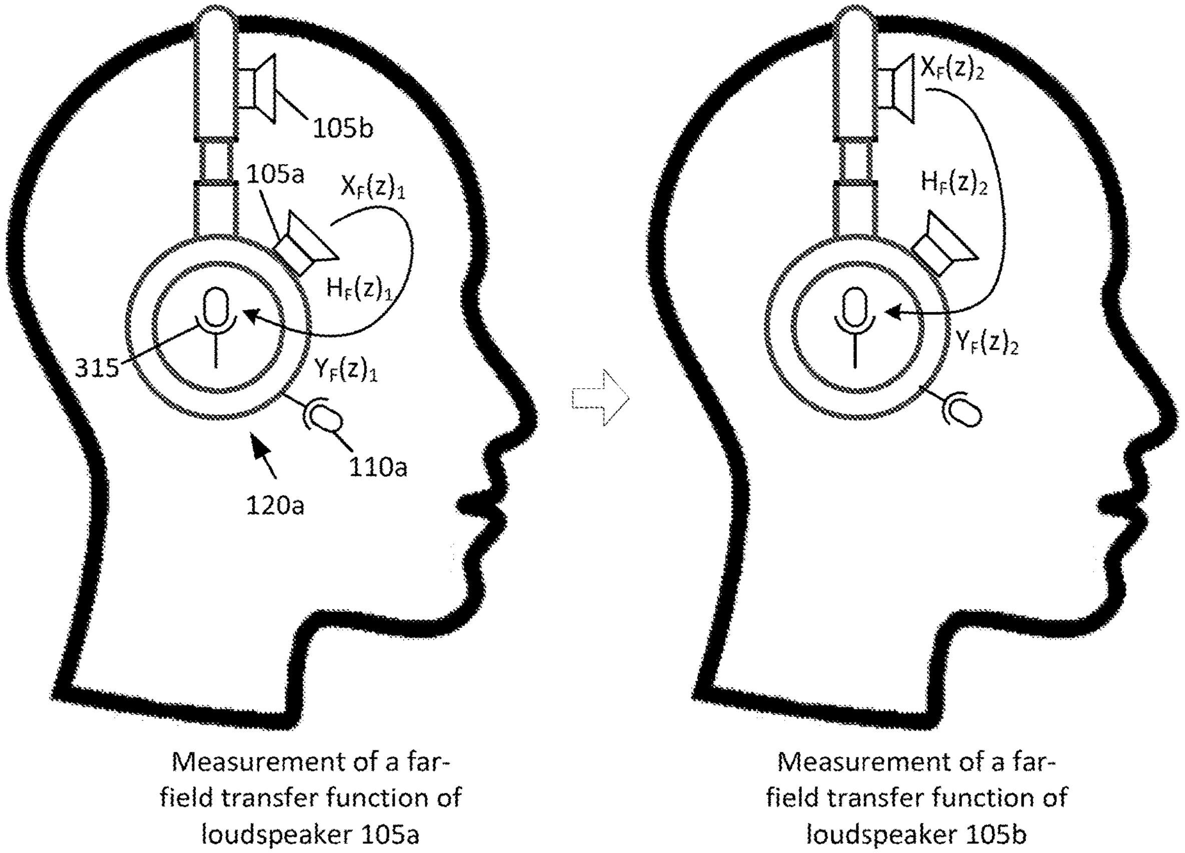
FIG. 3A shows far-field transfer function measurements for the loudspeaker array of the wearable device shown in FIG. 1.
Figure 3B:
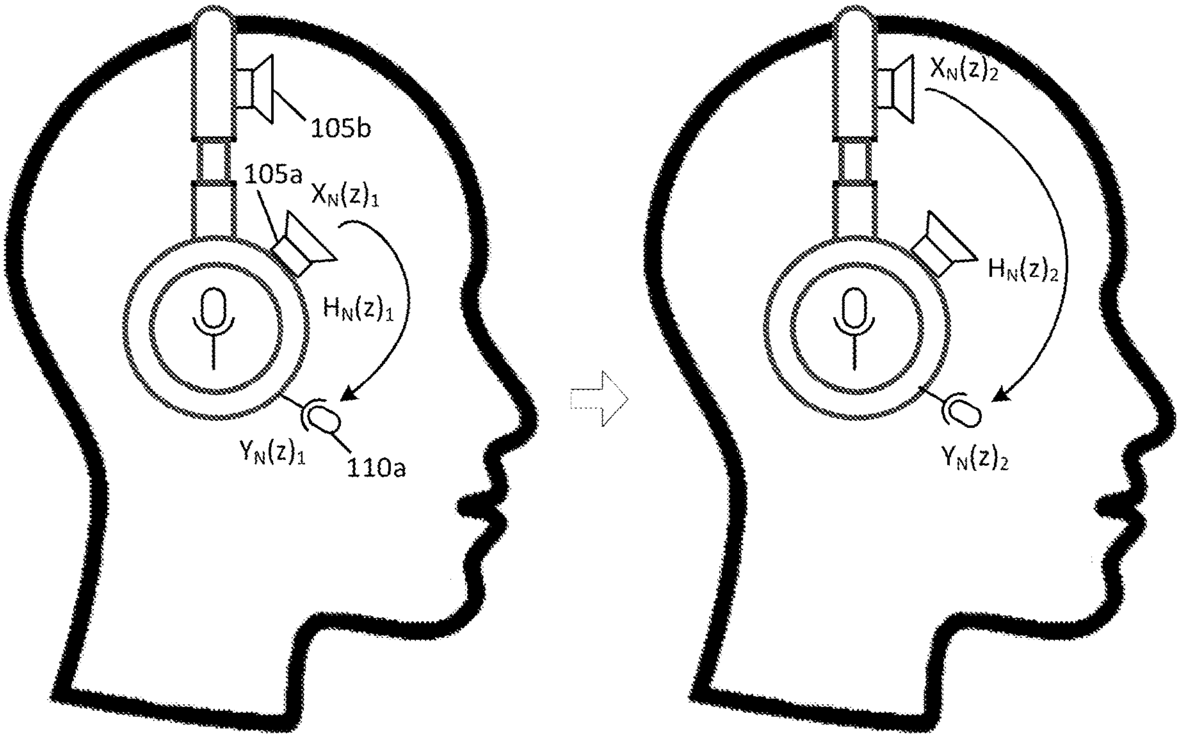
FIG. 3B shows near-field transfer function measurements for the loudspeaker array of the wearable device shown in FIG. 1.

In one aspect, similar to the microphone array, the loudspeaker array of the wearable device 100 may rely on far-field transfer functions to produce an expected directional sound beam pattern towards a particular location in space. Unlike the far-field transfer functions described in FIG. 2A, to achieve accurate spatial sound with the loudspeaker array, loudspeaker far-field transfer functions may represent phase differences between the loudspeakers 105 of the loudspeaker array. Thus, in order to compensate for phase differences due to changes in the physical arrangement of the loudspeaker array (caused when a shape of the wearable device changes), the loudspeaker far-field transfer functions need to be calibrated based on the changes. In order to account for these changes, far-field transfer function measurements for the loudspeakers in the loudspeaker array may be performed for different shapes of the wearable device 100 in a similar fashion as described in FIG. 2A. In one aspect, along with measuring the far-field transfer functions, the near-field transfer functions for at least one arrangement of loudspeakers of the loudspeaker array may be measured in a similar fashion, as described in FIG. 2B. The difference being 1) the loudspeakers 105*a*-105*d* of the wearable device 100 each produce a stimulus sound, while the loudspeakers used during the far-field measurement of FIG. 2A are replaced with microphones that represent locations in space at which a sound beam pattern is to be produced by the loudspeaker array, and 2) a microphone, such as 110*a* is used as a reference microphone during performance of the near-field measurement. FIGS. 3A-3B show examples of such measurements.

FIGS. 3A-3B show measurements of far-field transfer functions and near-field transfer functions of loudspeakers for a given physical arrangement of a loudspeaker array. Specifically, these figures show measurements being performed for loudspeakers 105*a* and 105*b* while the wearable device 100 is on a head of a manikin. In one aspect, measurements performed for these loudspeakers may be separate from loudspeakers 105*c* and 105*d*, since both pairs of loudspeakers may create different beam patterns when the loudspeaker array is outputting binaural sound (e.g., loudspeakers 105*a* and 105*b* producing a right-channel beam pattern, etc.). In another aspect, the measurements are not separate but instead are performed for all the loudspeakers of the loudspeaker array. In one aspect, similar to FIGS. 2A-2B, at least one of the measurements may be performed in a controlled environment (e.g., laboratory) for a given physical arrangement of the loudspeaker array. In another aspect, at least one of the measurements may be performed in the field.

FIG. 3A shows far-field transfer function measurements for the loudspeakers 105*a* and 105*b*. To perform the measurement, each of the loudspeakers produce a stimulus sound that is captured by a microphone 315 that is positioned at a particular location at which an expected sound beam pattern is to be steered. In this case, the microphone 315 is positioned at or near the outside (e.g., near an outer surface) of the right housing. In this case, the wearable device may be over-the-ear open-back headphones that allows some sound produced by the loudspeakers 105*a* and/or 105*b* to leak into the user's ear. Thus, the microphone 315 may represent an approximate location of an ear of a wearer. Specifically, this figure shows that loudspeaker 105*a* produces a sound output $X_F(z)_1$ that is captured by microphone 315 as input $Y_F(z)_1$; and loudspeaker 105*b* producing another sound output $X_F(z)_2$, separately (e.g., while every other loudspeaker is not producing sound), that is captured by microphone 315 as input $Y_F(z)_2$. From the microphone signals produced from the inputs captured by microphone 315, far-field transfer functions, $H_F(z)_1$ and $H_F(z)_2$, are measured for each loudspeaker.

FIG. 3B shows near-field transfer function measurements for loudspeakers 105*a* and 105*b*. In one aspect, the near-field transfer functions may be measured once a far-field transfer function measurement has been performed for at least one loudspeaker. Similar to the measurements of FIG. 2B, the near-field measurements may be associated with a given physical arrangement of the loudspeaker array. Or, specifically, in this case, the near-field measurements may be associated with a physical arrangement of a portion of the whole of the loudspeakers of the array (e.g., 105*a* and 105*b*). This figure shows loudspeaker 105*a* producing a sound output $X_N(z)_1$ that is captured by microphone 110*a* as input $Y_N(z)_1$; and loudspeaker 105*b* producing another sound output $X_N(z)_2$, separately, that is captured by microphone 110*a* as input $Y_N(z)_2$. From the microphone signals produced from the inputs captured by microphone 110*a*, near-field transfer functions, $H_N(z)_1$ and $H_N(z)_2$, are measured for each loudspeaker.

In some aspects, the measurements described in FIGS. 2A-3B may be performed differently. For example, rather than having each loudspeaker produce sound separately, at least some loudspeakers may produce the sound simultaneously.

In some aspects, the arrangement of a beamforming array may be determined (estimated) using other methods. One method is an optical method in which image data is used to determine the physical arrangement of the array. Specifically, the wearable device 100 may include at least one camera that produces image data (e.g., digital images) that is representative of a field of view of the camera that includes a scene. The camera may be positioned with respect to the wearable device 100, such that the scene includes at least a portion (or part) of the wearable device. In one aspect, the portion of the wearable device within the scene of the image data may include a point of interest, such as a marker and/or an element of the array (e.g., at least one microphone 110 of the microphone array and/or at least one loudspeaker 105 of the loudspeaker array) integrated therein. The camera captures the scene that includes the point of interest by producing image data, where the position of the point of interest within the scene indicates a given shape of the wearable device, and therefore a given physical arrangement of a beamforming array. As this process is repeated, the point of interest may move, due to different shapes of the wearable device (e.g., as the headband 101 flexes based on different sized heads). In one aspect, this determination is performed using image recognition software that is trained to identify that locations of points of interest indicate a particular physical arrangement of the microphone array. In one aspect, the image data may be produced by a camera that is external to the wearable device. For instance, the camera may be a part of a handheld portable device (e.g., a smartphone or tablet). More about estimating the physical arrangement of beamforming arrays using image data is described herein.

Another method may be a mechanical sensing method in which mechanical sensor data is used to determine the physical arrangement of the beamforming array. For example, the wearable device may include a mechanical sensor (not shown) that generates mechanical sensor data that indicates a change in (or a given) shape of a wearable device. For instance, a mechanical sensor, such as a strain gauge measures the tension in an object. Thus, in wearable devices that stretch or flex, such as the headband 101 of the wearable device 100, watch bands, and/or bracelets, the strain gauge may determine whether such wearable devices have expanded or contracted and by how much. When elements of the beamforming array are integrated into portions of the wearable device that are pliable, the mechanical sensor data may be used to determine the physical arrangement when such movement occurs. More about estimating the physical arrangement of the beamforming array using mechanical sensor data is described herein.

In one aspect, the near-field transfer functions, image data, and/or mechanical sensor data may represent a given physical arrangement of a beamforming array, and therefore a given shape of the wearable device 100 as physical arrangement data. This data may be associated with far-field transfer functions that are measured for the given physical arrangement of the array. Specifically, far-field transfer functions of elements of the array may be associated with corresponding near-field transfer functions of at least one of the elements for the given physical arrangement of the array. In one aspect, the far-field transfer functions of elements may also be associated with image data, and/or mechanical sensing data for the given physical arrangement of the array. In one aspect, the physical arrangement data may be determined for many different physical arrangements (caused by different shapes of the wearable device) and stored in a (e.g., table of a) data structure in which they are associated with corresponding far-field transfer functions of elements of the array. For example, with respect to the microphone array of FIG. 1, the table may include a first set of far-field transfer functions for one or more of the sound sources that are about the device, where the functions are associated with a first physical arrangement of the microphone array, and include a second set of far-field transfer functions for one or more of the sound sources that are about the device, where the functions are associated with a second physical arrangement of the microphone array.

In one aspect, one or more additional position-dependent audio settings may be adjusted for a given physical arrangement of a beamforming array and may be associated with physical arrangement data (e.g., in the data structure). These settings may be determined for audio elements of the beamforming array in order for the array to perform optimally when worn by different users. In one aspect, settings with respect to a loudspeaker array may include audio filter coefficients to adjust audio filters (e.g., low-pass filters, high-pass filters, band-pass filters, and all-pass filters) that perform spectral shaping upon a loudspeaker driver signal, dynamic range control settings, audio level adjustments, and spatial transfer functions (e.g., head-related transfer functions (HRTFs)). In one aspect, the audio filter coefficients may adjust audio filters by adjusting one or more cutoff frequencies of the filters. In another aspect, such settings with respect to a microphone array may include a microphone volume level.

In one aspect, these settings may be adjusted based on the separation between audio elements. For example, as loudspeakers in the loudspeaker array move apart from one another and from the user, sound produced by the loudspeakers may be perceived at a lower sound pressure level (SPL) by the user. Thus, in order to compensate for the movement, the audio level may be increased. In one aspect, adjustments are user-defined based on a given arrangement. In another aspect, adjustments are based on distances between audio elements exceeding a threshold.

In one aspect, settings may be determined based on the far-field transfer function measurements and/or near-field transfer function measurements for a given physical arrangement of an array, as described in FIGS. 2A-3B. For example, the far-field transfer functions $H_F(z)_1$ and $H_F(z)_2$ of FIG. 3A may be used to determine the HRTFs that are to be applied, since the microphone 315 is placed at a position of the ear (or in the ear).

Figure 4:
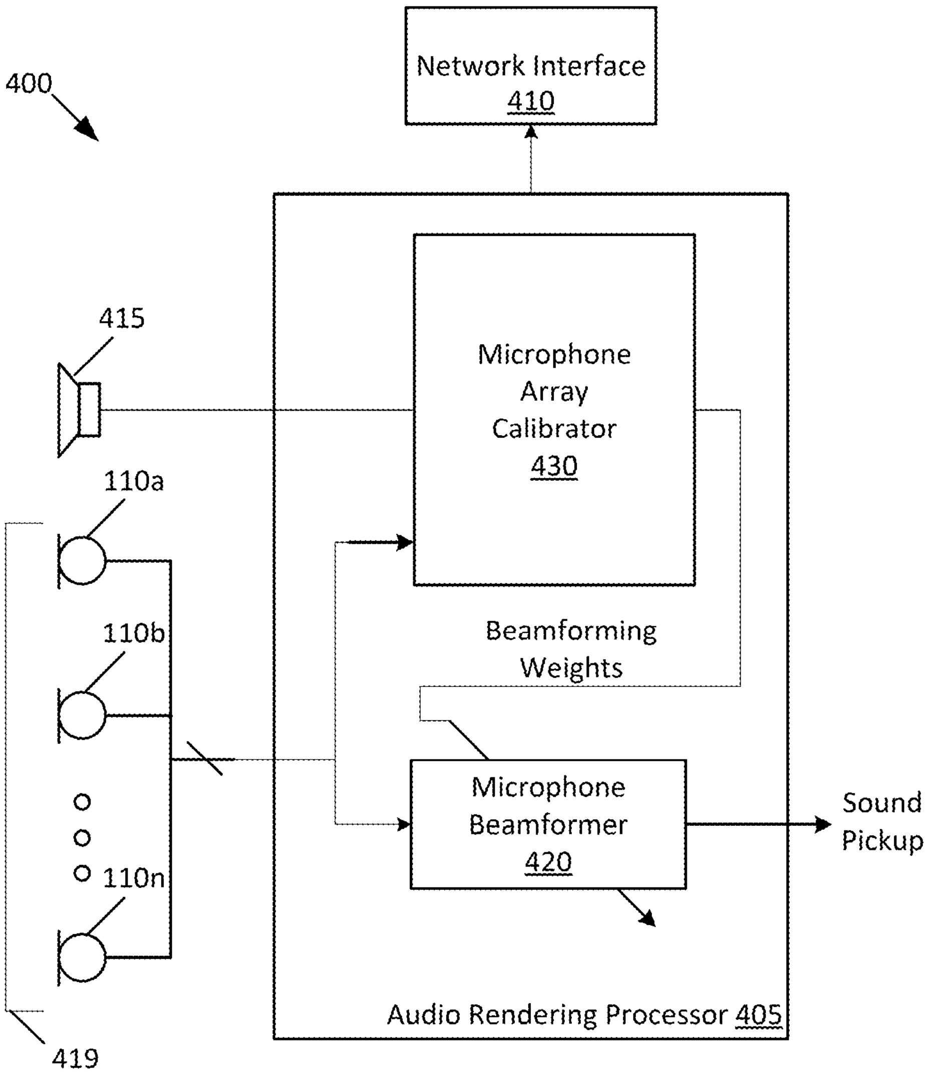
FIG. 4 shows a block diagram of an audio system for self-calibrating a microphone array.

FIG. 4 shows a block diagram of an audio system 400 for self-calibrating a microphone array of the wearable device 100. The self-calibrating audio system 400 includes an audio rendering processor 405, a network interface 410, a loudspeaker 415, and a microphone array 419 that makes up at least some of microphones 110*a*-110*n*. The self-calibrating audio system 400 may be incorporated into a wearable device 100, such as the headphones illustrated in FIG. 1. In one aspect, the loudspeaker 415 may be similar or the same as any one of the loudspeakers 105*a*-105*d* of FIG. 1. The network interface 410 is to establish a wireless communication link with another electronic device, such as a smartphone, using BLUETOOTH protocol, a wireless local network link, or any other wireless communication method. In one aspect, the network interface 410 is for communicating with a wireless access point (e.g., wireless router) that provides access to the Internet or a private computer network. For instance, the wearable device 100 may wirelessly communicate (e.g., using IEEE 802.11x standards or other wireless standards) with the smart phone or any other device by transmitting and receiving data packets (e.g., Internet Protocol (IP) packets). In one aspect, the network interface may communicate with another device over the air (e.g., a cellular network).

The audio rendering processor 405 may be implemented as a programmed processor, digital microprocessor entirely, or as a combination of a programmed processor and dedicated hardwired digital circuits such as digital filter blocks and state machines. The audio rendering processor 405 includes a sound pickup microphone beamformer 420 and a microphone array calibrator 430. The microphone beamformer 420 is configured to process microphone signals produced by the microphones 110*a*-110*n* of the microphone array 419 to form at least one directional beam pattern in a particular direction, so as to be more sensitive to one or more sound source locations. To do this, the microphone beamformer 420 may process one or more of the microphone signals by applying beamforming weights (or weight vectors). Once applied, the microphone beamformer 420 produces at least one sound pickup output signal that includes the directional beam pattern. Specifically, a beamformer output signal may be defined as:

$$y=w^H x$$

where w is a weight vector, x is the input microphone audio signal, and the superscript "H" represents the Hermitian transpose. In one aspect, the weight vectors may modify the input microphone signals by applying at least one of time delays, phase shifting, and amplitude adjustments in order to produce an expected beam pattern. For example, applying an amplitude adjustment allows for control of sidelobe levels of the expected beam pattern. In another aspect, the weight vectors may steer an expected beam pattern in a certain direction and/or may also define a beam pattern's directivity (e.g., beam width). In one aspect, multiple directional beam patterns may be formed, each either having similar or different shapes, thereby causing the beamformer to produce at least one output signal for each of the directional beam patterns.

The microphone array calibrator 430 is configured to calibrate the microphone array 419 based on the anthropometrics of a current user of the wearable device. Specifically, the calibrator 430 is configured to determine whether a physical arrangement of the microphone array 419 with respect to the loudspeaker 415, or any reference point, has changed. The beamforming array calibrator 430 may perform the determination upon an initial power up, and every following power up, of the wearable device 100. A power up may be when a user turns on the wearable device 100 (e.g., when a button on the wearable device 100 is pressed). As mentioned herein, the wearable device 100 may establish a communication link, via the network interface 410, with another device, such as a smartphone. The communication link may be established when the wearable device 100 detects that it is being worn by the user. For example, the wearable device may include an optical sensor (e.g., proximity sensor) that detects the wearable device 100 is being worn. In this case, the microphone array calibrator 430 may perform the determination each time the communication link is established with the other device. In one aspect, the calibrator may perform the determination at predefined time intervals (e.g., every 10 seconds, every 20 seconds, every 30 seconds, etc.), while the wearable device is activated. In one aspect, as described herein, when the wearable device 100 includes mechanical sensors, the calibrator 430 may perform the determination upon receiving mechanical sensor data that is produced in response to the mechanical sensor detecting (or sensing) a change in the shape of the wearable device 100.

In one aspect, the microphone array calibrator 430 may determine whether the physical arrangement of the microphone array 419 has changed, through the acoustic method in which the near-field transfer functions are measured. Specifically, the calibrator 430 may retrieve a known audio signal from storage (or from an external sound source via the network interface 410). In one aspect, the audio signal may represent a system start up sound that indicates a power up of the wearable device 100, or an establishment of a communication link with another device. In another aspect, the audio signal may be a part of an audio signal that is already being rendered and outputted through the loudspeaker 415. In one aspect, if the device 400 includes multiple loudspeakers that are outputting sound, the sound of the audio signal may be outputted by one of the loudspeakers, while the other loudspeakers are silenced (e.g., are ducked).

The beamforming array calibrator 430 uses the retrieved audio signal to measure a near-field transfer function for at least one microphone of the microphone array 419, as described in FIG. 2B. For example, with respect to the microphone array 419, a near-field transfer function of at least one of the microphones of the microphone array to the loudspeaker 415, responsive to the audio signal being outputted by the loudspeaker 415. In one aspect, in order to accurately compute the near-field transfer functions, each microphone has to receive a sufficient amount of the sound produced by the loudspeaker 415. Therefore, if the sound captured by the microphone has a sound energy level less than a threshold value, the processor 405 may adjust the audio signal (e.g., spectrally shape, increase gain value, etc.) in order for the sound produced by the loudspeaker to exceed the threshold value. In another aspect, if the wearable device is in an acoustic environment with ambient sound (e.g., background noise), the audio rendering process may implement active noise cancelation (ANC) algorithms to produce an anti-noise signal to cause the loudspeaker to produce anti-noise. The microphone array calibrator 430 sends the retrieved audio signal to the loudspeaker 415, which then outputs the audio signal. The calibrator 430 obtains microphone signals from at least one of the microphones of the array 419 and uses the microphone signals to determine (or measure) a current (or recent) near-field transfer function, $H_N(z)$, of at least one microphone of the array 419.

The current near-field transfer function, as previously described may represent a current physical arrangement of the microphone array 419. Thus, in one aspect, the calibrator 430 is configured to determine whether the physical arrangement has changed by comparing the current near-field transfer function to physical arrangement data. Continuing with the previous example, the calibrator 430 compares the currently measured near-field transfer functions of the microphones 110 with near-field transfer functions that are associated with a previous physical arrangement of the microphone array 419. Specifically, these "pre-existing" near-field transfer functions may have been previously determined by the calibrator 430, before the current near-field transfer functions. In one aspect, the pre-existing near-field transfer functions are stored in memory (e.g., in the data structure, as previously described) of the wearable device 100 as physical arrangement data that is associated with far-field transfer functions that are being used by the calibrator before the current near-field transfer function is determined. The calibrator determines whether the physical arrangement of the microphone array 419 has changed by determining whether any of the current near-field transfer functions are different than the pre-existing transfer functions. If so, the microphone array 419 is determined to have changed its physical arrangement.

In one aspect, the calibrator 430 is configured to adjust far-field transfer functions of microphones of the microphone array 419, in response to determining that the physical arrangement of the microphone array 419 has changed. Specifically, the calibrator 430 may perform a table lookup using the current near-field transfer functions into the data structure that stores the physical arrangement data (e.g., near-field transfer functions) with associated far-field transfer functions. The calibrator 430 compares the recently determined near-field transfer functions to the near-field transfer functions of the physical arrangement data, to identify at least one matching near-field transfer function within the physical arrangement data. When at least one associated near-field transfer function of the physical arrangement data matches at least one of the recent near-field transfer functions of the microphones, the calibrator 430 selects a far-field transfer function that is associated with the matching transfer function. The calibrator 430 adjusts the far-field transfer functions by replacing far-field transfer functions that are being used by the calibrator 430 with new far-field transfer functions that are associated with the matching near-field transfer function. In one aspect, the calibrator 430 may only adjust far-field transfer functions that are associated with near-field transfer functions that have changed based on the change to the physical arrangement of the microphone array 419.

In one aspect, the calibrator 430 only adjusts far-field transfer functions that are different than transfer functions that are being used by the calibrator prior to determining the current near-field transfer function. Thus, once a new far-field transfer function is selected, the calibrator 430 may compare the transfer function with a corresponding transfer function to determine whether they are different. If so, the calibrator uses the new one.

Once new far-field transfer functions are selected based on a current physical arrangement of the microphone array 419, the calibrator 430 is configured to calibrate or tune the microphone beamformer 420 according to the current physical arrangement of the microphone array 419. For example, the calibrator 430 may determine (or compute) new beamforming weight vectors using the new far-field transfer functions (and any pre-existing transfer functions from prior to determining the current near-field transfer function). Specifically, the far-field transfer functions may define the directivity of a directional beam pattern and/or may define a direction at which the beamformer is to steer the directional beam pattern towards a particular sound source. The calibrator 430 is further configured to supply the newly computed beamforming weight vectors to the microphone beamformer 420 in order for the beamformer 420 to adjust the directional beam patterns according to the change in the physical arrangement of the microphone array 419.

Electronic devices having conventional microphone arrays are made up of several microphones that are in a fixed position with respect to one another. To perform beamforming operations these devices may apply fixed weights, since the microphones in their arrays do not move. With wearable devices, however, weights must be changed to adapt to any changes in the physical arrangement of the microphone array, since the weights rely on the phase differences between the microphones to be constant (or known). Adjusting weight vectors may be performed through adaptive beamforming, in which an adaptive algorithm (e.g., Least Mean Square, Recursive Least Squares, etc.) updates the weight vector. These adaptive algorithms, however, require an extensive amount of processing power. Instead, in one aspect, the weight vectors for a given arrangement of the microphone array may be computed using the far-field transfer functions as described herein. Thus, when the beamforming array calibrator 430 determines that the physical arrangement of the microphone array 419 has changed, it may adjust the far-field transfer functions according to that change, and then compute new weight vectors using the adjusted far-field transfer functions. The audio rendering processor 405 may apply each of the input audio signals with a corresponding new weight in order to produce an expected beam pattern.

In one aspect, the calibrator 430 is further configured to adjust position-dependent audio settings based on the current physical arrangement of the microphone array 419. Specifically, similar to the adjusted far-field transfer functions, the calibrator 430 may use the currently determined near-field transfer function(s) to perform a table lookup in the data structure that associates the transfer functions with position-dependent audio settings. Thus, the calibrator 430 may select one or more position dependent audio settings that is associated with a matching transfer function. Thus, the audio rendering processor 405 may use the newly selected position-dependent audio settings to perform corresponding audio signal processing upon the microphone signals and/or the beamformer output signal(s).

In one aspect, the far-field transfer functions and/or position-dependent audio settings being currently used by the device 400 (e.g., pre-existing from before the current near-field transfer function was determined) when a difference between at least one of the recently determined near-field transfer functions and a corresponding near-field transfer function that is associated with a previously determined physical arrangement of the microphone array 419 is at or below a difference threshold. In one aspect, the pre-existing near-field transfer function may have been the latest measured near-field transfer function that represents a previous physical arrangement of the array. In one aspect, the difference may be a percentage value in which the recent near-field transfer function has changed with respect to the previous near-field transfer function, e.g., 5%, 7%, 10%, etc. This may mean, for example, that although there may have been a change in the physical arrangement of the microphone array 419, this change will not have a significant negative impact on the expected directional beam pattern, e.g., by steering the beam away from a desired sound source.

When, however, a recent near-field transfer function is different (e.g., exceeding the threshold difference) than the previous near-field transfer function of the corresponding microphone of the microphone array 419 that is stored in the data structure, the microphone array calibrator 430 is to adjust the far-field transfer functions. In this case, the microphone may have moved significantly, which would negatively affect the beamforming operations. For example, a resulting beam pattern may deviate from an expected beam pattern.

Figure 5:
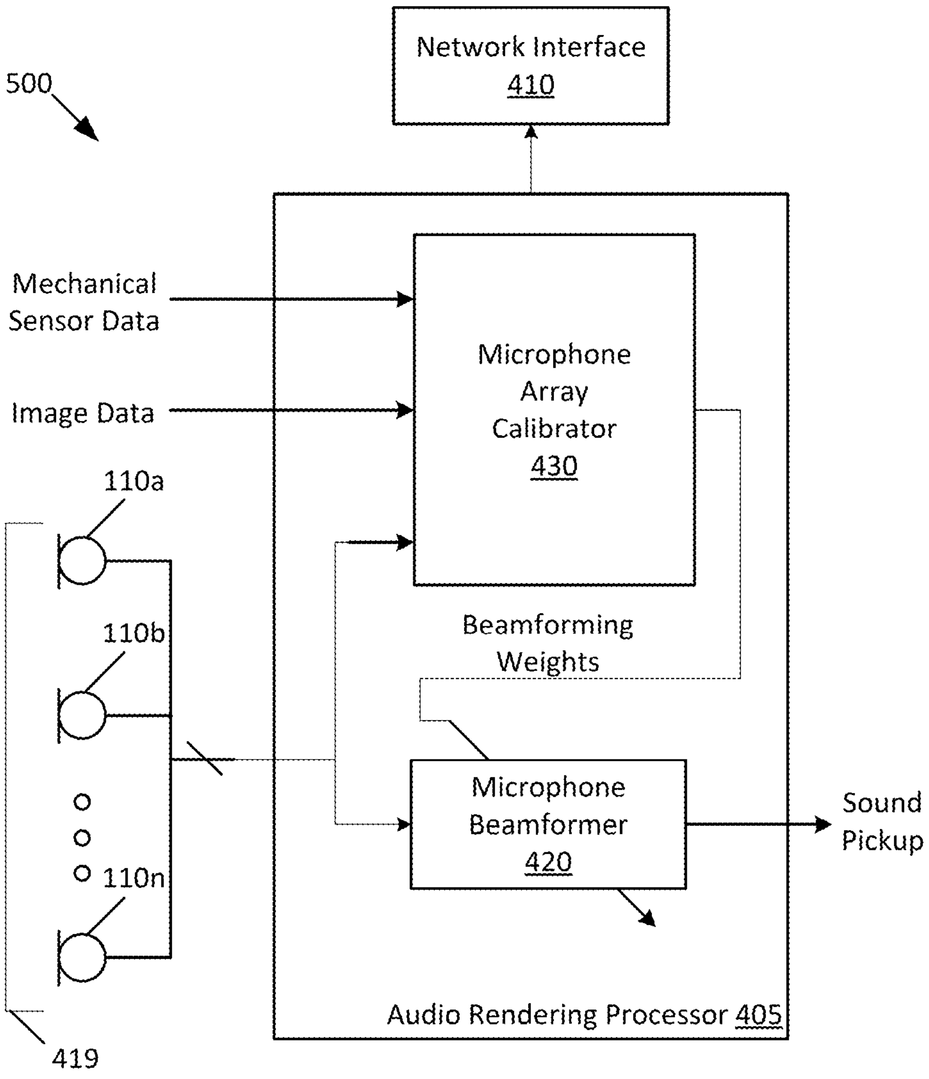
FIG. 5 shows another block diagram of an audio system for self-calibrating a microphone array.

FIG. 5 shows a block diagram of an audio system 500 for self-calibrating the microphone array 419 of the wearable device 100 using the optical and/or mechanical sensing method, as described herein. In one aspect, the audio system 500 includes most of the elements of audio system 400, as described in FIG. 4. In one aspect, the audio system 500 is different from audio system 400 in that the calibrator 430 of system 500 receives image and/or mechanical sensor data. The microphone array calibrator 430 is configured to determine how to adjust far-field transfer functions and/or position-dependent audio settings based on a determination of a physical arrangement of a microphone array 419 using the optical and/or mechanical sensing method. With the optical method, the calibrator 430 is to obtain (receive) image data from a camera (not shown) of the wearable device (or from an electronic device that is separate from the wearable device) that produces image data that is representative of a field of view of the camera that includes a scene. As described herein, the scene may include at least a portion (or part) of the wearable device 100 having a point of interest such as a marker. Similar to the acoustic method, the calibrator 430 may receive the image data from the camera during each initial power up of the wearable device 100, or at certain time intervals, for example.

The calibrator 430 is configured to compare the obtained (current or recent) image data with previously obtained image data that is associated with a physical arrangement of the array before the current image data was obtained. In one aspect, the previously obtained image data may be physical arrangement data that is stored in the storage. In one aspect, the calibrator 430 may perform the comparison through the use image recognition software. Rather than compare the whole scene represented within the image data, the calibrator 430 may compare regions of interest (e.g., 200×200 pixels) at a location within the scene, such as a location of a point of interest and a surrounding area. In one aspect, the calibrator 430 may make this determination based on whether there are changes in particular pixels between both the image data. If the current image data is different than the previously obtained image data, the calibrator 430 determines that the physical arrangement of the array has changed. In one aspect, the determination that there has been a change may be based on whether a percentage of difference between the image data is above a threshold. In other words, the determination is based on whether there is a significant difference between the previously obtained image data and the current image data.

The calibrator 430 is further configured to compare the current image data with the image data of the physical arrangement data in order to identify matching image data. Once a match is found, which represents a current physical arrangement of the array, the calibrator 430 selects far-field transfer functions associated with the matching image data.

With respect to the mechanical sensing method, the calibrator 430 is to obtain (receive) mechanical sensor data from a mechanical sensor (not shown) of the wearable device 100. In one aspect, the mechanical sensor may generate the mechanical sensor data in response to sensing a change in the shape of the wearable device 100. For instance, the mechanical sensor may be a strain gauge that is integrated into a portion of a pliable portion of the wearable device 100, such as in the headband 101, or in another wearable device, for example a watch band or bracelet. When the shape of the wearable device 100 changes, e.g., bends or stretches, the tension of the strain gauge may increase or decrease in response. The change in tension will produce mechanical sensor data that may include a voltage signal and/or a resistance value of the strain gauge, associated with the voltage signal. In another embodiment, mechanical sensors may be used to determine the relative position between at least two portions of a device that contains audio elements. For example, a rotational encoder may be arranged to determine an angle about an axis between two or more portions of a device. Specifically, the rotational encoder may detect rotation (or movement) of one (first) portion of a device that is rotatably coupled to another (second) portion of the device, and may produce mechanical sensor data (e.g., an electrical signal, which may be either analog or digital) that represents an angle between the two portions. A specific example may be a wearable device, such as headphones or smart glasses. For instance, the rotational encoder may be coupled to a temple and the frame of the glasses, such that when the temple rotates about an axis (e.g., through a hinge coupling both components together), the encoder detects the movement and produces the electrical signal.

The calibrator 430 is configured to compare the obtained (current or recent) mechanical sensor data with the mechanical sensor data of the physical arrangement data that is stored in storage to determine corresponding far-field transfer functions and/or position-dependent audio settings that are to be applied, similar to the previously mentioned methods.

In one aspect, rather than retrieving one or more (new or different) far-field transfer functions and/or position-dependent audio settings from the data structure to be used to adjust beamforming algorithms, the calibrator 430 may adjust (or modify) the far-field transfer functions and/or position-dependent audio settings that are being used by the audio system 500 from before the calibrator 430 determines whether there has been a change in the physical arrangement of the array. Specifically, the calibrator 430 may compare the current physical arrangement data that represents a current physical arrangement of the array, with previously determined physical arrangement data (e.g., data, such as near-field responses, image data, and/or mechanical sensor data, that represents a physical arrangement of the microphone array 419 that was determined from before) to determine a difference between arrangements. For instance, the previously determined physical arrangement data may include a physical arrangement of the array that was determined prior to a current arrangement. In one aspect, the far-field transfer functions may be modified according to that difference. For example, with respect to the acoustic method, the calibrator 430 may adjust the far-field transfer functions based on the difference between one or more currently obtained near-field transfer functions and one or more corresponding previously determined near-field transfer functions. With respect to the optical method, the calibrator 430 may adjust the far-field transfer functions based on differences between a scene represented by currently obtained image data with a scene represented by previously obtained image data. For example, the calibrator 430 may compare a location of a point of interest in the previous image data with the point of interest in the currently obtained image data to determine a distance (and angle) traveled. This distance may represent a change in the shape of the wearable device. With respect to the mechanical sensing method, the calibrator 430 may adjust the far-field transfer functions based on the identified mechanical sensor data. In one aspect, the calibrator 430 may only change a portion of the far-field transfer functions that are for elements of the array that have actually changed positions in response to the change in shape of the wearable device 100, in order to compensate for the change in the physical arrangement of the array. In one aspect, once the far-field transfer functions are adjusted, the physical arrangement data of the array may be stored within a data structure with the far-field transfer functions.

To get better accuracy, in one aspect, the calibrator may adjust the far-field transfer functions using two or more of the methods described above. For example, the calibrator 430 may use mechanical sensors on (or in) the headband 101 of the headphones 100 of FIG. 1 to determine whether the headband bends or stretches, and it may use the acoustic method to determine whether the one of the housings 120 and/or 120*b* has moved (e.g., moving away from a center vertical axis that runs through the headband 101).

Figure 6:
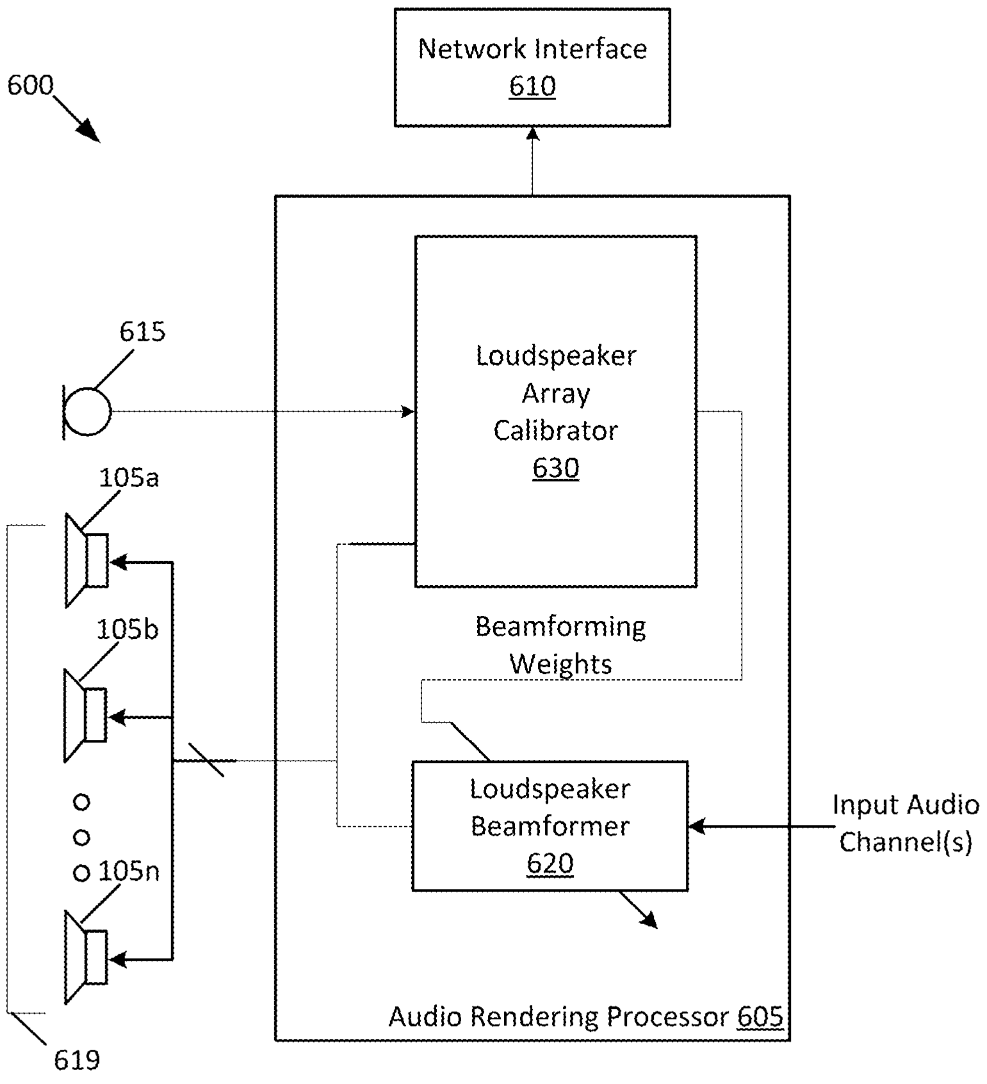
FIG. 6 shows a block diagram of an audio system for self-calibrating a loudspeaker array.

FIG. 6 shows a block diagram of an audio system 600 for self-calibrating a loudspeaker array of the wearable device 100. The self-calibrating audio system 600 includes an audio rendering processor 605, a network interface 610, a microphone 615, and a loudspeaker array 619 that makes up at least some of the loudspeakers 105*a*-105*n*. In one aspect, the microphone 615 may be similar or the same as any one of the microphones 110*a*-110*d* of FIG. 1.

In one aspect, the audio rendering processor 605 may be implemented in a similar fashion to the audio rendering processor 405 of FIG. 4. The audio rendering processor 605 includes a loudspeaker beamformer 620 and a loudspeaker array calibrator 630. The loudspeaker beamformer 620 is configured to operate in a similar fashion to the microphone beamformer 420. Specifically, the beamformer 620 is configured to produce individual drive signals for the loudspeakers 105*a*-105*n* so as to "render" audio content of at least one output audio channel(s) as one or more desired sound beam patterns emitted by the loudspeaker array 619. Similar to beamformer 420, the sound beam patterns produced by the loudspeaker array 419 may be shaped and steered by the beamformer 620, according to beamformer weight vectors that are each applied to the output audio channel. In one aspect, the beamformer weight vectors may be the same or similar to the beamformer weight vectors used by the microphone beamformer 420. In another aspect, they may be different. In one aspect, sound beam patterns produced by the loudspeaker array 619 may be tailored from input audio channels, in accordance with any one of a number of pre-configured, sound modes. For example, the beamformer may include two or more mid-side modes in which an omnidirectional pattern is superimposed with a directional pattern that has several lobes, and at least one main-diffuse (e.g., ambient-direct) mode in which a main content pattern is superimposed with several diffuse content patterns. These modes are viewed as distinct stereo enhancements to the input audio channels from which the system can choose, based on whichever is expected to have the best or highest impact on a listener in a particular room (and for the particular content that is being outputted). The audio rendering processor 605 is pre-configured with such operating modes, and its current operating mode can be selected and changed in real time (e.g., by the user of the wearable device, or by the audio rendering processor 605), during output of a piece of sound program content.

The audio rendering processor 605 is configured to process input audio for outputting through the loudspeaker array 619. For example, the audio rendering processor 605 is to receive sound program content to be rendered by the audio rendering processor 605 and output through the loudspeaker array 619. The sound program content may be received from a sound source external to the wearable device 100 (e.g., a smartphone) over a wireless communication link, via the network interface 610. In one aspect, the audio rendering processor may retrieve sound program content from local memory storage. The sound program content may be a single audio channel (e.g., mono), or it include two or more input audio channels, such as a left and right input audio channel that may represent a musical work that has been recorded as two channels. Alternatively, there may be more than two input audio channels. In one aspect, when there are multiple input audio channels, they may be downmixed to produce a single downmixed audio signal. The audio rendering processor 605 produces at least one loudspeaker beamformer input signal from the input audio signal (or single downmixed audio signal) for driving one or more loudspeakers of the loudspeaker array 619.

The loudspeaker array calibrator 630 is configured to calibrate or tune the loudspeaker array 619 in a similar fashion to the calibrator 430 of FIG. 4. For example, the calibrator 630 is configured to determine a current physical arrangement of the loudspeaker array 419 with respect to the microphone 615, or any reference point, as according to the acoustic method as previously described. The calibrator 630 is further configured to adjust at least one current far-field transfer function of a loudspeaker of the array 619 based on whether the current physical arrangement of the array 619 has changed. The calibrator is further configured to determine new beamforming weight vectors using the adjusted far-field transfer function, and to supply the new vectors to the loudspeaker beamformer 620. In one aspect, the calibrator may supply the new vectors in real-time (e.g., while sound is being captured in microphone signals produced by the microphones in the array).

Figure 7:
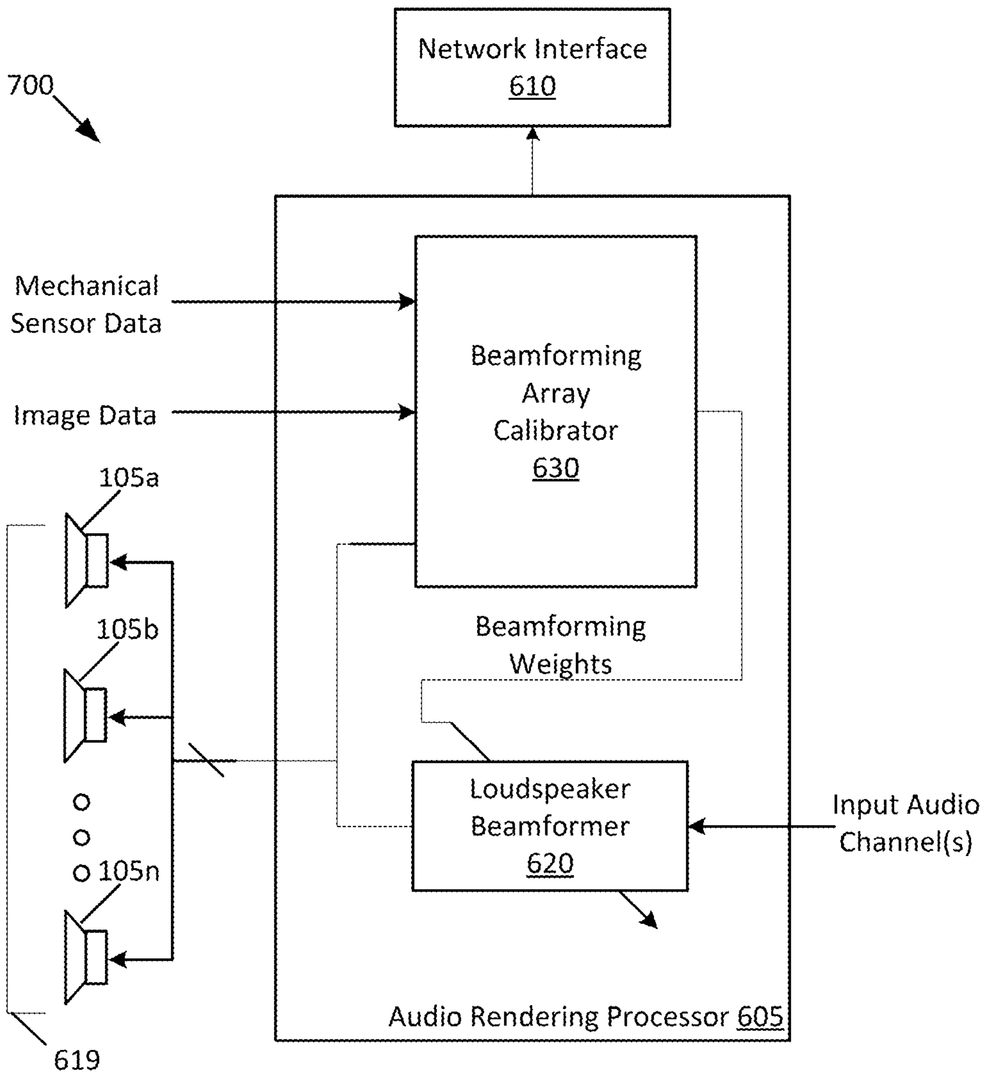
FIG. 7 shows another block diagram of an audio system for self-calibrating a loudspeaker array.

FIG. 7 shows a block diagram of 700 for self-calibrating the loudspeaker array 619 of the wearable device 100 using the optical and/or mechanical sensing method, as described herein. In one aspect, the audio system 700 includes most of the elements of audio system 600, as described in FIG. 6. In one aspect, the audio system 700 is different from audio system 600 in that the calibrator 630 of the system 700 receives image and/or mechanical sensor data. Thus, the calibrator 630 is configured to determine how to adjust far-field transfer functions associated with the loudspeakers of the loudspeaker array 619 and/or position-dependent audio settings based on a determination of a physical arrangement of the loudspeaker array 619 using the optical and/or mechanical method. In some aspects, the calibrator 630 calibrates the loudspeaker array 619 in a similar fashion as described in FIG. 5.

In one aspect, at least a portion of the elements and/or operations performed as described in FIGS. 4-7 may be a part of one audio system. For example, the audio rendering processor 405 of FIG. 4 may include a microphone beamformer 420 and a loudspeaker beamformer 620, in the case in which the wearable device includes both a microphone array 419 and a loudspeaker array 619, as illustrated in FIG. 1. In this case, the calibrator 430 may perform both microphone and/or loudspeaker calibration operations as described herein.

Generally, a manufacturer fabricates an audio element, such as a microphone and a loudspeaker to a particular specification. To ensure this, the manufacturer of a microphone may test its performance by comparing a microphone signal from reference microphone with a microphone signal of the microphone that is being tested. To test a loudspeaker, a manufacturer may measure loudspeaker characteristics (e.g., impedance, etc.) while outputting a test signal. When manufacturers mass produce audio elements, however, testing each element to ensure it is up to specification may not feasible. As a result, there may be variability between elements fabricated by one manufacturer that are in the beamforming array. In addition, variability may also exist between elements fabricated by different manufacturers. This variability may reduce the effectiveness of the beamforming array.

To correct for this variability, in one aspect, the calibrator 430 may determine whether there is a deviation of an expected phase difference between microphones 110 in the microphone array 419 and/or the loudspeakers 105 in the loudspeaker array 619. To do this, the calibrator may perform a near-field transfer function measurement, as described in above. With respect to the microphones, the calibrator 430 determines or measures at least one of a phase difference between at least two microphones 110 in the microphone array 419 and a gain difference between the at least two microphones, using the near-field transfer functions of both microphones. Since the locations of the microphones and the loudspeaker 415 that is acting as a sound source are known, the calibrator 430 can determine an expected phase difference and an expected gain difference between the at least two microphones. From the expected differences and the differences that are actually determined through this process, the calibrator 430 determines whether the differences deviate by a threshold value, which can be an integer value or a percentage. If so, the calibrator 430 may instruct the audio rendering processor 405 to apply a linear filter to the microphone signal associated with the microphone that includes the variability, in order to correct for the deviation in phase and/or gain. In one aspect, the linear filter may be one of a low-pass filter, a high-pass filter, a band-pass filter, and an all-pass filter. In one aspect, the calibrator 430 performs similar operations with respect to the loudspeakers. For instance, the calibrator 430 determines or measures at least one of a phase difference between at least two loudspeakers 105 and a gain difference between the at least two loudspeakers, using the near-field transfer functions of both loudspeakers. The calibrator 430 determines whether the differences deviate an expected difference by a threshold value, as previously described. If so, one or more of the previously mentioned linear filters may be applied to the loudspeaker signals.

Although the elements of the systems 400-700 are illustrated as having wired connections such as any suitably fast combination of on-chip and chip-to-chip digital or electro-optical interconnects, in one aspect communication between the elements may be through a wireless digital communication link, such as a BLUETOOTH link or a wireless local area network link. For example, as previously described, the wearable device 100 may be a combination of several separate wearable devices that act in concert. In this case, the microphones 110 of the microphone array 419 may be positioned separate from the audio rendering processor 405, and both may communicate through a wireless digital communication link.

In one aspect, the determination of which far-field transfer function is associated with currently measured physical arrangement data may be performed remotely. The calibrator 430 may transmit a message that includes the currently measured physical arrangement data (e.g., near-field transfer functions, image data, and/or mechanical sensor data), via the network interface 410 to another device, such as a handheld device that is paired (linked) with the wearable device 100 (e.g., a smartphone, etc.) or an electronic server of a manufacturer or a third party. The other device may use the physical arrangement data to perform a table lookup into a data structure that associates far-field transfer functions with physical arrangement data, both of which were previously measured for the wearable device as described in FIGS. 2A-3B. The other device selects the far-field transfer functions associated with matching physical arrangement data, and transmits a response message to the wearable device that includes selected far-field transfer functions. Once received, the calibrator 430 updates the far-field transfer functions. In one aspect, the calibrator 430 may store the received far-field transfer functions and associated physical arrangement data in the data structure stored in storage, to reflect the current physical arrangement of the array. In one aspect, the calibrator 430 may transmit only a portion of the physical arrangement data (e.g., near-field responses that exceed the threshold difference, etc.). As a result, the other device's response message may only contain new far-field transfer functions associated with the transmitted portion.

Figure 8:
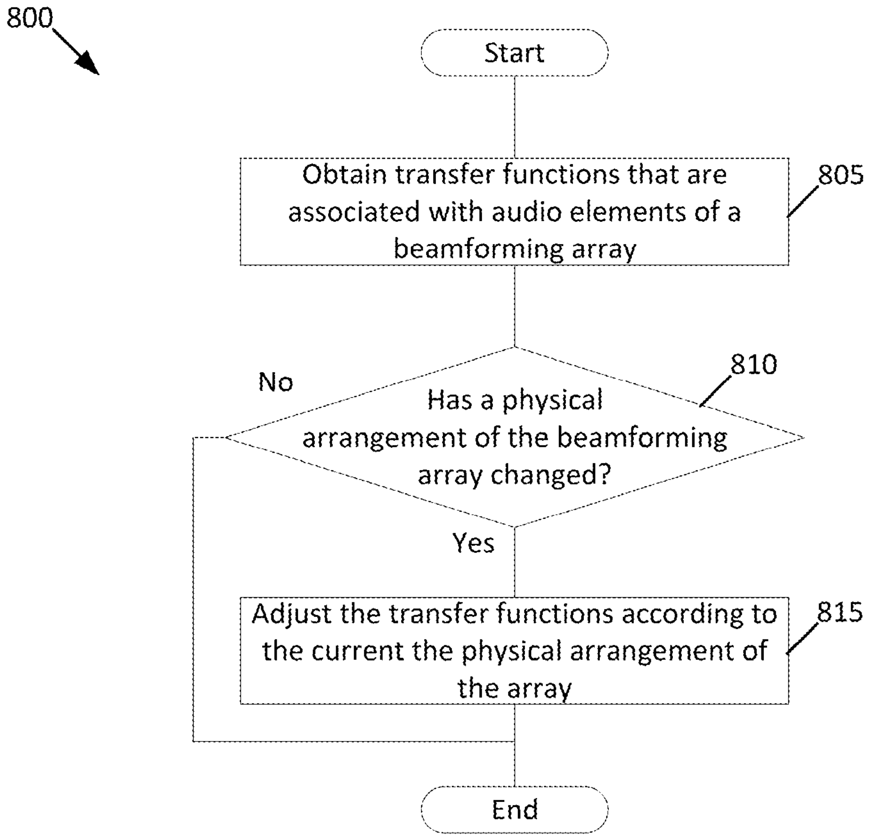
FIG. 8 is a flowchart of one aspect to perform self-calibrating beamforming process.

FIG. 8 is a flowchart of one aspect of a process 800 to perform a self-calibrating beamforming process to produce at least one directional beam pattern. In one aspect, the process 800 may be performed by a self-calibrating audio system that is operating in the wearable device 100, as described in FIGS. 1-7. In FIG. 8, process 800 begins by obtaining, for each of the audio elements a beamforming array, one or more transfer functions that each represents a response between the audio elements and a position in an acoustic space, according to a physical arrangement of the beamforming array of the wearable device 100 (at block 805). Specifically, the wearable device 100 may retrieve a data structure from an external source, such as a server operated by a manufacturer of the wearable device or a third party, via the network interface (e.g., 410). In one aspect, when the audio elements are microphones, the transfer function represents a response of the microphone to sound from a position in the acoustic space. While, when the audio elements are loudspeakers, the transfer function represents a response of the loudspeaker to a sound pickup position in the acoustic space. Once retrieved, the data structure may be stored in local memory storage (e.g., of the audio rendering processor 405). In one aspect, the data structure is the data structure described in FIGS. 2A-3B, which includes several transfer functions for one or more physical arrangements of the beamforming array. In one aspect, the transfer function is the far-field transfer function. The process 800 determines whether a physical arrangement of the beamforming array of the wearable device has changed (at decision block 810). In one aspect, the wearable device 100 may determine whether the physical arrangement of the beamforming array has changed by performing at least one of the following methods: the acoustic method, the optical method, and the mechanical sensing method, and comparing current data determined during the performance of the at least one method with physical arrangement data stored within the device 100. If the physical arrangement has changed, the process 800 adjusts the transfer function for at least one of the elements of the beamforming array (at block 815). For instance, the calibrator 430 may perform a table lookup into the data structure, according to the changed physical arrangement of the beamforming array. For instance, the calibrator 430 may modify at least one of the transfer functions based on the change of the physical arrangement (e.g., a difference between a current physical arrangement with a previously determined physical arrangement).

Figure 9:
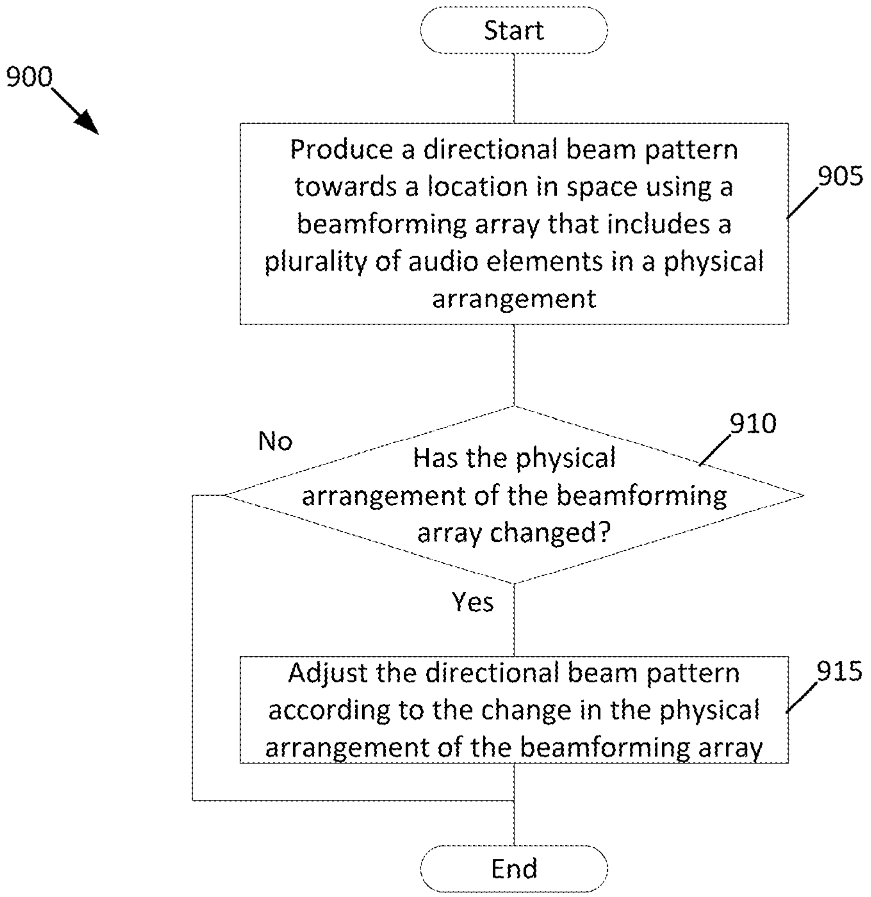
FIG. 9 is a flowchart of one aspect to perform self-calibrating beamforming process while a beamforming array is producing a directional beam pattern.

FIG. 9 is a flowchart of one aspect of a process 900 to perform a self-calibrating beamforming process to adjust at least one sound beam pattern. In one aspect, the process 900 may be performed by a self-calibrating audio system that is operating in the wearable device 100, as described in FIGS. 1-7. The process begins by producing, using a beamforming array that includes one or more audio elements, a directional beam pattern towards a location in space (at block 905). In one aspect, while producing the directional beam pattern, the audio elements are in a physical arrangement. The process 900 determines whether there has been a change in the physical arrangement of the audio elements (at decision block 910). For instance, the wearable device 100 may perform any one of the methods described herein. In one aspect, the wearable device 100 may determine the change based on a comparison between a current physical arrangement and a previously determined physical arrangement. In one aspect, a change in the physical arrangement directs the directional beam pattern away from the location in space. In addition, in some aspects, a change in the physical arrangement may render position-dependent audio settings ineffective. If it is determined that there has been a change, the process 900 adjusts the directional beam pattern according to the change in the physical arrangement (at block 915). For example, the wearable device may adjust far-field transfer functions, beamforming weight vectors, and/or the audio settings based on the change. As a result of the adjustment, when the change in the physical arrangement has caused the directional beam pattern to move away from the location in space, the directional beam pattern may be steered back towards the location in space.

In one aspect, the operations performed in the processes 800 and 900 of FIGS. 8 and 9, respectively, are performed for a beamforming array. For example, either process may be performed for either a microphone array (e.g., 419), a loudspeaker array (e.g., 619), or both, as described herein. For example, with respect to the microphone array 419, the process 800 is for self-calibrating a sound pickup process by adjusting far-field transfer functions of the microphones 110 of the array 419 based on a current physical arrangement of the microphone array 419. As another example, with respect to the loudspeaker array 619, the process 800 is for self-calibrating a sound output process by adjusting transfer functions of loudspeakers of the array 619 based on a current arrangement of the array 619.

Some aspects perform variations of the processes described in FIGS. 2-9. For example, the specific operations of these processes may not be performed in the exact order shown and described, and/or specific operation may be omitted entirely. For example, at the time of manufacturing, generic far-field transfer functions and associated physical arrangement data of the microphone array and/or loudspeaker array may be stored in local memory of the device 100. As previously mentioned, generic far-field transfer functions are transfer functions that are associated with a shape of the wearable device that fits an average user's anthropometrics, in order to accommodate a broader spectrum of users. Therefore, block 805 in process 800 may be omitted, since far-field transfer functions are already stored locally, and instead the process can start with determining that a current physical arrangement of their respective arrays at blocks 810. The specific operations may not be performed in one continuous series of operations, and different specific operations may be performed in different aspects. In another variation, rather than adjust the directional beam pattern according to the determined change, in one aspect, the process 900 may omit block 915 in some circumstances. For example, if the change is below a threshold (e.g., a minor change), the wearable device may not adjust the beam pattern.

In one aspect, beamformer weight vectors, rather than far-field transfer functions may be associated with physical arrangement data and stored in the data structure described herein. Thus, for example, when the microphone array 419 determines that there is a change in its physical arrangement (e.g., at decision block 810), the weights may be adjusted (e.g., by either retrieving new weights or modifying the current weights based on the determined current physical arrangement of the microphone array 419) at block 815.

Figure 10:
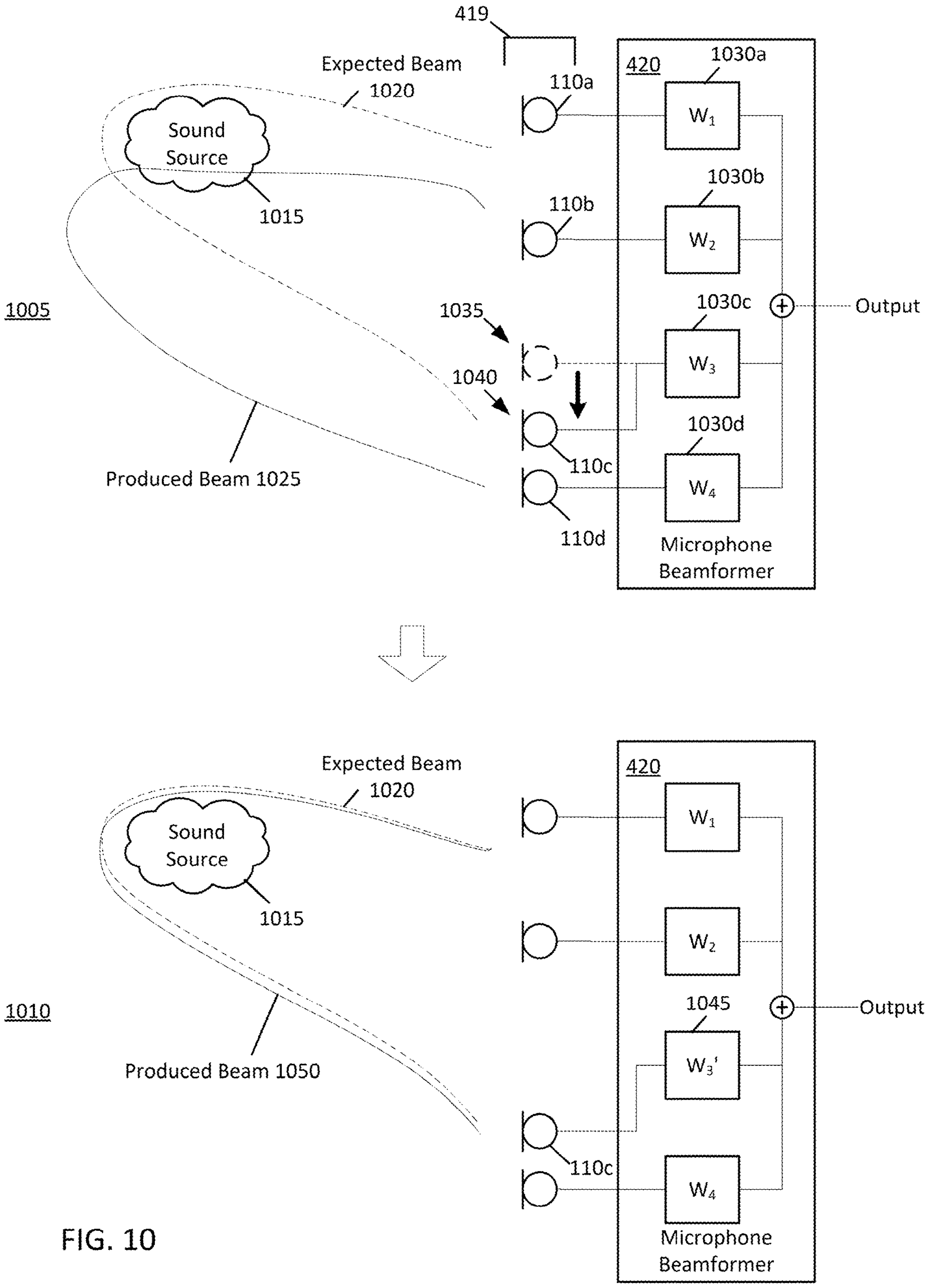
FIG. 10 shows a calibration of a beamforming process in order to direct a sound pattern towards a sound source in response to a change in a physical arrangement of a microphone array.

FIG. 10 shows a calibration of a beamforming process in order to direct a sound pattern towards a sound source in response to a change in a physical arrangement of a microphone array. Specifically, this figure illustrates two stages 1005-1010 that shows beamformer 420 adjusting calibrating beamformer weights 1030 in order to steer a directional beam pattern 1025 towards a sound source 1015, and line up with an expected directional beam pattern 1020. This figure will be described with reference to FIG. 4.

Stage 1005 illustrates the beamformer 420 of the wearable device 100 that is attempting to produce an expected directional beam pattern 1020 towards a sound source 1015, but because one of the microphones 110*c* has changed positions, thereby changing the physical arrangement of the microphone array 419, the actual beam pattern 1025 produced by the beamformer 420 is ajar. This may be caused by, for example, the wearable device 100 changing its shape (e.g., to fit the anthropometrics of a new user), and thereby changing the physical arrangement of the microphone array 419. Before the microphone 110*c* was moved, it was originally at a position 1035, which was closer to microphone 110*b*. While the microphone 110*c* was at its original position 1035, the wearable device 100 may have calibrated the microphone array 419 to determine far-field transfer functions associated with the array's physical arrangement. Once performed, the calibrator 430 may have determined and supplied each of the microphone weights 1030*a*-1030*d* to the beamformer 420 in order to apply each of the weights to a corresponding microphone signal, according to each microphone's far-field transfer function. Once, however, the microphone 110*c* moved to new position 1040, the weight 1030*c* applied to the microphone signal of the moved microphone 110*c* was no longer effective, since for example the actual phase differences between microphones 110*c* and 110*d* are different from the expected phase differences from which the weights 1030*a*-1030*d* were determined. As a result, the directional beam pattern 1025 is not capturing the sound from the desired sound source 1015.

Stage 1010 illustrates the beamformer 420 producing a directional beam pattern 1050 that is very similar to the expected directional beam pattern 1020, after calibrating the microphone array 419 to compensate for the movement of microphone 110*c*. For example, the calibrator 430 would have detected the movement of the microphone 110*c*, using at least one of the methods described herein. In response, the calibrator 430 adjusts the far-field transfer functions, according to the detected movement, and determines a new weight 1045 for microphone 110*c* based on the adjusted far-field transfer functions. The new weight vector 1045 compensates for the phase change between at least microphones 110*c* and 110*d*, since they are closer together than in stage 1005.

In one aspect, the directional beam pattern 1050 may be identical to the expected directional beam pattern 1020. In this case, the produced directional beam pattern 1050 is slightly different but almost exact to the expected directional beam pattern 1020, which may be due to varies conditions, such as variations between the microphones 110*a*-110*d* and foreign objects that may be partially blocking one of the microphones.

In one aspect, although much of the discussion described thus far related to beamforming operations for either a microphone beamforming array or a loudspeaker beamforming array, this is for illustrative purposes only. It should be understood that such operations are interchangeable between both types of arrays. Thus, for example, rather than FIG. 10 show a calibration of a sound pickup beamforming process, this figure may be slightly modified to illustrate a calibration of a sound output beamforming process. For instance, the microphone array 419 may be replaced by the loudspeaker array 619, and the microphone beamformer 420 may be replaced with the loudspeaker beamformer 620. As a result, rather than sum the signals from each of the weights, the weights may receive at least a portion of an input audio signal. In one aspect, the weights used between arrays may be the same or similar to those used for the sound pickup beamforming process, or they may be different.

In one aspect, a wearable device includes a loudspeaker, an external microphone array having a physical arrangement with respect to the loudspeaker, a camera that is configured to capture image data that is representative a scene that includes a portion of the wearable device, a mechanical sensor that is configured to generate mechanical sensor data that indicates an amount of mechanical motion by the portion of the wearable device, a processor, and memory. The memory includes instructions which when executed by the processor causes the wearable device to obtain a microphone signal from each of the microphones in the microphone array, apply a far-field transfer function to the microphone signal that represents a response between the microphone and a position in space, determine a current physical arrangement of the microphone array based on at least one of the image data, the sensor data, and the microphone signals, and select at least one different far-field transfer function to be applied to a corresponding microphone signal according to the current physical arrangement.

As previously explained, an aspect of the disclosure may be a non-transitory machine-readable medium (such as microelectronic memory) having stored thereon instructions, which program one or more data processing components (generically referred to here as a "processor") to perform the audio signal processing operations and sound pickup operations. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

The present disclosure recognizes that use of personally identifiable information should follow privacy policies and practices that are generally recognized as meeting or exceeding governmental or industry requirements for maintaining the privacy of users. Specifically, personally identifiable information data should be handled and managed so as to reduce risks of unintentional or unauthorized access or use, and the nature of authorized use should be clearly indicated to users.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method for self-calibrating a beamforming process that uses a beamforming array of a plurality of audio elements in a wearable device, the method comprising:

producing, using the beamforming array, a directional beam pattern towards a location in space, wherein the directional beam pattern is produced based on a physical arrangement of the plurality of audio elements in the beamforming array;

determining whether there has been a change in the physical arrangement of the beamforming array; and adjusting the directional beam pattern according to the change in the physical arrangement of the beamforming array.

2. The method of claim 1, wherein determining whether there has been a change in the physical arrangement comprises:

retrieving a data structure comprising a plurality of predefined physical arrangements of the plurality of audio elements in the beamforming array;

determining a current physical arrangement of the plurality of audio elements in the beamforming array; and performing a table lookup into the data structure to identify a matching predefined physical arrangement to the current physical arrangement, wherein the matching predefined physical arrangement is different than the physical arrangement.

3. The method of claim 2, wherein the beamforming array uses a first set of far-field transfer functions, one for each audio element of the beamforming array, to produce the directional beam pattern, wherein the data structure associates a plurality of sets of far-field transfer functions of the plurality of audio elements with different predefined physical arrangements, wherein adjusting the directional beam pattern comprises selecting and using a second set of far-field transfer functions that are associated with the current physical arrangement in order to cause the directional beam pattern to be redirected towards the location in space.

4. The method of claim 2, wherein the beamforming array is a loudspeaker array, and the plurality of audio elements are a plurality of loudspeakers, wherein the directional beam pattern is a sound output directional beam pattern caused by sound produced by the plurality of loudspeakers, wherein the data structure associates position-dependent audio settings of one or more loudspeakers with different predefined physical arrangements of the plurality of loudspeakers, wherein the method further comprises selecting one or more position-dependent audio settings according to the current physical arrangement for application to cause an adjustment to the sound produced by the plurality of loudspeakers.

5. The method of claim 4, wherein the position-dependent audio settings comprises at least one of head-related transfer functions (HRTFs), audio level adjustments, audio filter coefficients, and dynamic range control settings.

6. The method of claim 2, wherein the wearable device comprises an external microphone configured to capture sound, wherein the beamforming array is a loudspeaker array and the plurality of audio elements are a plurality of loudspeakers, wherein determining the current physical arrangement of the plurality of loudspeakers of the loudspeaker array comprises:

for each loudspeaker, separately, playing back an audio signal by the loudspeaker; and measuring a near-field transfer function of the loudspeaker to the external microphone, responsive to the audio signal being played back by the loudspeaker.

7. The method of claim 1, wherein the beamforming array is a microphone array and the plurality of audio elements are a plurality of microphones, wherein the directional beam pattern is a sound pickup directional beam pattern produced using microphone signals from the plurality of microphones.

8. An electronic device comprising:

a plurality of audio elements;

at least one processor; and memory having stored therein instructions which when executed by the at least one processor causes the electronic device to:

produce, using the plurality of audio elements, a directional beam pattern towards a location in space, wherein the directional beam pattern is produced based on a physical arrangement of the plurality of audio elements;

determine whether there has been a change in the physical arrangement of the plurality of audio elements; and adjust the directional beam pattern according to the change in the physical arrangement of the plurality of audio elements.

9. The electronic device of claim 8, wherein the instructions to determine whether there has been a change in the physical arrangement comprises instructions to:

retrieve a data structure comprising a plurality of predefined physical arrangements of the plurality of audio elements;

determine a current physical arrangement of the plurality of audio elements; and perform a table lookup into the data structure to identify a matching predefined physical arrangement to the current physical arrangement, wherein the matching predefined physical arrangement is different than the physical arrangement.

10. The electronic device of claim 9, wherein a first far-field transfer function for an audio element is used to produce the directional beam pattern, wherein the data structure associates a plurality of far-field transfer functions of the audio element with different predefined physical arrangements, wherein adjusting the directional beam pattern comprises selecting and using a second far-field transfer function that is associated with the current physical arrangement in order to cause the directional beam pattern to be redirected towards the location in space.

11. The electronic device of claim 9, wherein the plurality of audio elements are a plurality of speakers, wherein the directional beam pattern is a sound output directional beam pattern caused by sound produced by the plurality of speakers, wherein the data structure associates position-dependent audio settings of one or more speakers with different predefined physical arrangements of the plurality of speakers, wherein the memory comprises further instructions to select one or more position-dependent audio settings according to the current physical arrangement for application to cause an adjustment to the sound produced by the plurality of speakers.

12. The electronic device of claim 11, wherein the position-dependent audio settings comprises at least one of head-related transfer functions (HRTFs), audio level adjustments, audio filter coefficients, and dynamic range control settings.

13. The electronic device of claim 8 further comprising a microphone to capture sound of an acoustic environment, wherein the plurality of audio elements comprises a plurality of speakers, wherein the instructions to determine whether there has been a change in the physical arrangement comprises instructions to:

for at least one speaker, play back an audio signal by the at least one speaker; and measure a near-field transfer function of the speaker to the microphone, responsive to the audio signal being played back by the speaker.

14. The electronic device of claim 8 comprises a sensor for producing sensor data, wherein the instructions to determine whether there has been a change in the physical arrangement comprises instructions to, at least one of:

determine whether the sensor data is at or above a threshold value; and compare the sensor data to previously produced sensor data by the sensor.

15. The electronic device of claim 8, wherein the electronic device is a pliable device, wherein the physical arrangement of the plurality of audio elements changes in response to a shape of the pliable device changing.

16. A non-transitory machine-readable medium having stored therein instructions which when executed by at least one processor of an electronic device causes the electronic device to:

produce, using a plurality of audio elements, a directional beam pattern towards a location in space, wherein the directional beam pattern is produced based on a physical arrangement of the plurality of audio elements;

determine whether there has been a change in the physical arrangement of the plurality of audio elements; and adjust the directional beam pattern according to the change in the physical arrangement of the plurality of audio elements.

17. The non-transitory machine-readable medium of claim 16, wherein the instructions to determine whether there has been a change in the physical arrangement comprises instructions to:

retrieve a data structure comprising a plurality of predefined physical arrangements of the plurality of audio elements;

determine a current physical arrangement of the plurality of audio elements; and perform a table lookup into the data structure to identify a matching predefined physical arrangement to the current physical arrangement, wherein the matching predefined physical arrangement is different than the physical arrangement.

18. The non-transitory machine-readable medium of claim 17, wherein a first far-field transfer function for an audio element is used to produce the directional beam pattern, wherein the data structure associates a plurality of far-field transfer functions of the audio element with different predefined physical arrangements, wherein adjusting the directional beam pattern comprises selecting and using a second far-field transfer function that is associated with the current physical arrangement in order to cause the directional beam pattern to be redirected towards the location in space.

19. The non-transitory machine-readable medium of claim 16, wherein the plurality of audio elements comprises a plurality of speakers, wherein the instructions to determine whether there has been a change in the physical arrangement comprises instructions to:

for at least one speaker, play back an audio signal by the at least one speaker; and measure a near-field transfer function of the speaker to a microphone, responsive to the audio signal being played back by the speaker.

20. The non-transitory machine-readable medium of claim 16, wherein the plurality of audio elements comprises a plurality of microphones, wherein the directional beam pattern is a sound pickup directional beam pattern produced using microphone signals from the plurality of microphones.

* * * * *